United States Patent
Suzuki et al.

(10) Patent No.: US 11,242,048 B2
(45) Date of Patent: Feb. 8, 2022

(54) PARKING ASSISTANCE METHOD AND PARKING CONTROL DEVICE

(71) Applicant: Nissan Motor Co., Ltd., Yokohama (JP)

(72) Inventors: Yasuhiro Suzuki, Kanagawa (JP); Ko Sato, Kanagawa (JP); Daisuke Tanaka, Kanagawa (JP); Yasuhiro Sakurai, Kanagawa (JP); Ryota Yamanaka, Kanagawa (JP); Junya Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/625,530

(22) PCT Filed: Jul. 7, 2017

(86) PCT No.: PCT/JP2017/025000
§ 371 (c)(1),
(2) Date: Dec. 20, 2019

(87) PCT Pub. No.: WO2019/008757
PCT Pub. Date: Jan. 10, 2019

(65) Prior Publication Data
US 2020/0369262 A1 Nov. 26, 2020

(51) Int. Cl.
*B60R 1/00* (2006.01)
*B60W 30/06* (2006.01)
(Continued)

(52) U.S. Cl.
CPC ............ *B60W 30/06* (2013.01); *B60R 11/04* (2013.01); *G06K 9/00798* (2013.01); *G06K 9/00812* (2013.01); *B60R 2300/806* (2013.01)

(58) Field of Classification Search
None
See application file for complete search history.

(56) References Cited

U.S. PATENT DOCUMENTS 6,476,730 B2 * 11/2002 Kakinami ............. B60Q 9/005
340/435
7,599,773 B2 * 10/2009 Tanaka ............... B62D 15/0285
340/932.2
(Continued)

FOREIGN PATENT DOCUMENTS

CN 100590563 C 2/2010
CN 105539427 A 5/2016
(Continued)

*Primary Examiner* — K. Wong
(74) *Attorney, Agent, or Firm* — Young Basile Hanlon & MacFarlane, P.C.

(57) ABSTRACT

In a parking assistance method of a parking control device which executes parking control with respect to a free parking space surroundings a host vehicle, a first frame line of free parking space in a direction orthogonal to a vehicle width direction and a second frame line which forms a pair with the first frame line are detected, and a parking target is set on a straight line connecting between a point on the first frame line and a point on the second frame line, for example, the parking target is set on the straight line connecting between an end on the first frame line and an end on the second frame line, and parking control is executed so that a position of wheels of the host vehicle is matched with the parking target.

7 Claims, 18 Drawing Sheets

(51) Int. Cl.
*B60R 11/04* (2006.01)
*G06K 9/00* (2006.01)

(56) References Cited

U.S. PATENT DOCUMENTS

| | | | |
|---|---|---|---|
| 7,660,659 | B2 | 2/2010 | Watanabe et al. |
| 8,229,645 | B2* | 7/2012 | Lee .................... B62D 15/0285 |
| | | | 701/96 |
| 8,305,204 | B2* | 11/2012 | Nagamine .............. B60Q 9/005 |
| | | | 340/435 |
| 8,330,816 | B2* | 12/2012 | Imamura ............ G06K 9/00805 |
| | | | 348/148 |
| 9,321,400 | B2* | 4/2016 | Wakabayashi ............ B60R 1/00 |
| 9,493,070 | B2 | 11/2016 | Fukata et al. |
| 9,659,223 | B2* | 5/2017 | Itou .......................... B60K 1/04 |
| 9,836,658 | B2* | 12/2017 | Kiyokawa .......... B62D 15/0285 |
| 10,124,728 | B2* | 11/2018 | Fujio .................. B62D 15/0295 |
| 10,155,540 | B2* | 12/2018 | Kiyokawa ............... G08G 1/165 |
| 10,810,446 | B2* | 10/2020 | Hayakawa ................ G06T 7/12 |
| 2006/0287800 | A1 | 12/2006 | Watanabe et al. |
| 2015/0098624 | A1 | 4/2015 | Sakakibara et al. |
| 2015/0321555 | A1 | 11/2015 | Fukata et al. |
| 2016/0114795 | A1 | 4/2016 | Kiyokawa et al. |
| 2018/0037262 | A1 | 2/2018 | Imai |
| 2020/0148263 | A1 | 5/2020 | Imai |

FOREIGN PATENT DOCUMENTS

| | | |
|---|---|---|
| EP | 2927078 A1 | 10/2015 |
| JP | 2006-347428 A | 12/2006 |
| JP | 2015-74257 A | 4/2015 |
| JP | 2016-084094 A | 5/2016 |
| JP | 2017-021747 A | 1/2017 |
| WO | 2008/117386 A1 | 10/2008 |
| WO | 2016/158236 A1 | 10/2016 |

* cited by examiner

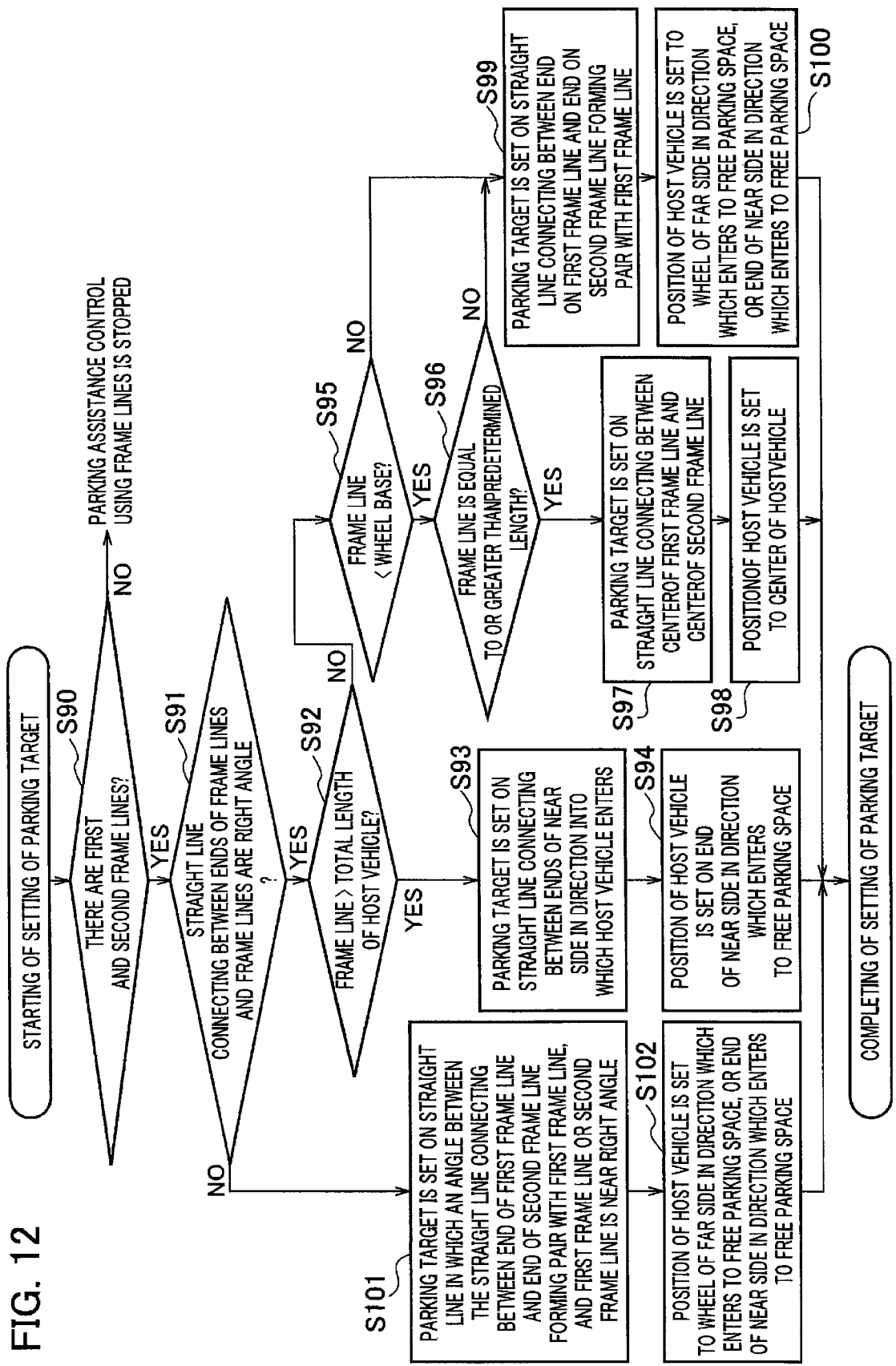

PARKING ASSISTANCE METHOD AND PARKING CONTROL DEVICE

TECHNICAL FIELD

The present invention relates to a parking assistance method and a parking control device.

BACKGROUND

Conventionally, there has been known a parking control device for supporting a driving operation for parking a vehicle in a parking area such as a parking space described in Patent Literature, for example. Japanese Patent Application Laid-Open Publication No. 2015-74257 discloses connects between ends of parking frame lines to set a target destination section.

SUMMARY

However, since the conventional example disclosed in Japanese Patent Application Laid-Open Publication No. 2015-74257 merely executes parking control so that a vehicle is within the target destination section, it fails to assume that the vehicle may protrude through the target destination section. Therefore, there is a possibility that the vehicle cannot be parked at an appropriate position in the target destination section.

The present invention has been made in light of the above-mentioned problem, and the object of the present invention is to provide a parking assistance method and a parking control device for enabling a vehicle to be parked at an appropriate position.

A parking assistance method according to one aspect of the present invention comprising: detecting a first frame line of a free parking space in a direction orthogonal to a vehicle width direction and a second frame line; setting a parking target on a straight line connecting between a point on the first frame line and a point on the second frame line; and executing parking control so that a position of wheels of a host vehicle is matched with the parking target.

According to the parking assistance method according to the present invention, the vehicle can be parked at the appropriate position of the free parking space.

BRIEF DESCRIPTION OF THE DRAWINGS

FIG. 12 is a flow chart showing a processing procedure of setting a parking target, according to the embodiment of the present invention;

DETAILED DESCRIPTION

Descriptions will be hereinbelow provided for the embodiments of the present invention on the basis of the drawings.

Figure 1:
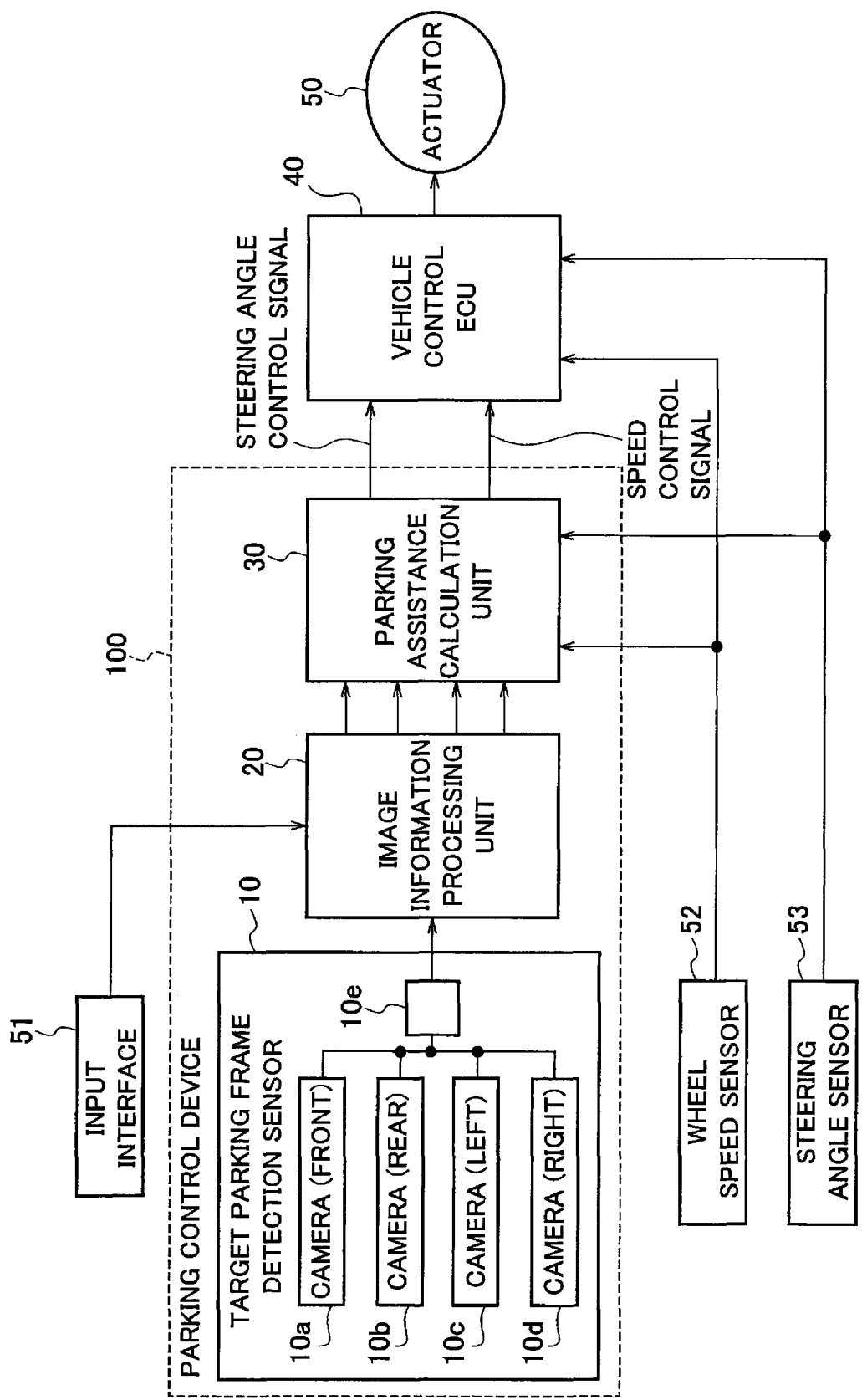
FIG. 1 is a block diagram for illustrating a partial configuration of a vehicle in which a parking control device according to an embodiment of the present invention.

FIG. 1 is a block diagram for illustrating a partial configuration of a vehicle in which a parking control device according to an embodiment of the present invention. As shown in FIG. 1, this parking control device 100 generates the steering angle control signal and speed control signal which are outputted to the vehicle control ECU 40. The parking used in the present embodiment means moving a vehicle toward a free parking space and stopping the vehicle at the free parking space. For the vehicle, it means moving to a free parking space and stopping in the free parking space, in order to park the vehicle in the parking space in a parking lot.

The parking control device 100 includes a target parking frame detection sensor 10, an image information processing unit 20 (target position setting circuit), and a parking assistance calculation unit 30 (vehicle control circuit).

The target parking frame detection sensor 10 is configured of a plurality of cameras which captures a periphery of a vehicle, for example. A camera 10a is mounted in front of the vehicle and captures the front of the vehicle. A camera 10b is mounted in rear of the vehicle and captures the rear of the vehicle. A camera 10c is mounted at a left side of the vehicle and captures the left side of the vehicle. A camera 10d is mounted at a right side of the vehicle and captures the right side of the vehicle. Each camera is installed on a lower side from a roof of the vehicle.

The target parking frame detection sensor 10 may be configured of another sensor(s). For example, it may be configured of a laser range finder LRF) for emitting an infrared laser towards an object and measures the distance to the object on the basis of a strength of a reflected light, or the like. It is also possible to detect a length, such as a white line for representing a parking space on the basis of the strength of the reflected light. Alternatively, a clearance sonar using an ultrasonic wave may be used. Alternatively, the target parking frame detection sensor 10 may not always be sensors installed in the vehicle, but may be sensors (e.g., a camera in a parking lot, a sensor or a camera equipped in another vehicle) installed at a periphery of the host vehicle. In this case, data obtained by the sensors installed at the periphery of the vehicle may be transmitted to the host vehicle using wireless communications. The present embodiment will explain an example of configuring a target parking frame detection sensor 10 by means of a camera installed in the host vehicle.

The image information processing unit 20 performs image recognition of image information of surroundings of the host vehicle captured by the target parking frame detection sensor 10, and generates information required for parking assistance. The information is output to the parking assistance calculation unit 30. The information required for the parking assistance will be mentioned below in detail.

An input interface 51, a wheel speed sensor 52, and a steering angle sensor 53 in addition to the image information processing unit 20 are connected to the parking assistance calculation unit 30. In addition, an output of the parking assistance calculation unit 30 is connected to the vehicle control ECU 40.

The target parking frame detection sensor 10 further includes a frame line detection circuit 10e configured to detect a first frame line of a free parking space in a direction orthogonal to the vehicle width direction and a second frame line which forms a pair with the first frame line, from an image captured by each camera (10a to 10d). The target position setting circuit 20 sets a parking target on a straight line connecting between a point on the first frame line and a point on the second frame line. The vehicle control circuit 30 executes parking control so that a position of wheels of the host vehicle is matched with the parking target. More specifically, the vehicle control circuit 30 generates a target parking route to the parking target, controls a position of the host vehicle, a posture of the host vehicle, and a speed of the host vehicle so as to be along the generated target parking route, and executes stop control is so that a predetermined position of the host vehicle (wheels, end of the vehicle) is matched with the target position. In addition, it is not necessary to specify the first frame line and the second frame line in the present embodiment among the frame lines composing the parking space. That is, the first frame line may be any one of the near side or the far side in the vehicle width direction of the parking space, and may any one of the longer side or the shorter side thereof. Moreover, when detecting the length of the first frame line and comparing the length of the first frame line with the total length of the host vehicle and the length between the front wheel and the rear wheel of the host vehicle, the first frame line may be any one of two frame lines composing the parking space.

According to the parking control device 100 including the target parking frame detection sensor 10, the target position setting circuit 20, and the vehicle control circuit 30, the host vehicle can be parked at an appropriate position of the free parking space.

The input interface 51 is a terminal configured to input various information with regard to adjustment of a parking position by an operator, selection of the parking position, a parking method (forward parking, backward parking), and the like. The various operation input devices etc. to be mounted in the vehicle, such as a joy stick, an operation switch, a touch panel, may be provided in the vehicle, assuming a case where the operator goes on. Moreover, audio assist for prompting a driver various operational inputs using a loudspeaker installed in the vehicle.

The wheel speed sensor 52 is a sensor for detecting a wheel speed of the host vehicle.

The steering angle sensor 53 is a sensor for detecting a steering angle of the host vehicle, and an encoder attached to a rotation axis of a steering is general used therefor.

The parking assistance calculation unit 30 generates the steering angle control signal and the speed control signal on the basis of various information with regard to each information required for the parking assistance generated by the image information processing unit 20, wheel speed information of the host vehicle detected by the wheel speed sensor 52, steering angle information detected by the steering angle sensor 53, and the parking position to be input into the input interface 51.

The steering angle control signal and the speed control signal generated by the parking assistance calculation unit 30 are input into the vehicle control ECU 40. Moreover, the wheel speed sensor 52 and the steering angle sensor 53 are connected to the vehicle control ECU 40. An output of the vehicle control ECU 40 is connected to an actuator 50 for controlling the steering, the vehicle speed, and the like.

The image information processing unit 20 and the vehicle control ECU 40 may be formed as, for example, an integrated computer including a central processing unit (CPU), a RAM, a ROM, and storage means such as a hard disk drive.

Figure 2:
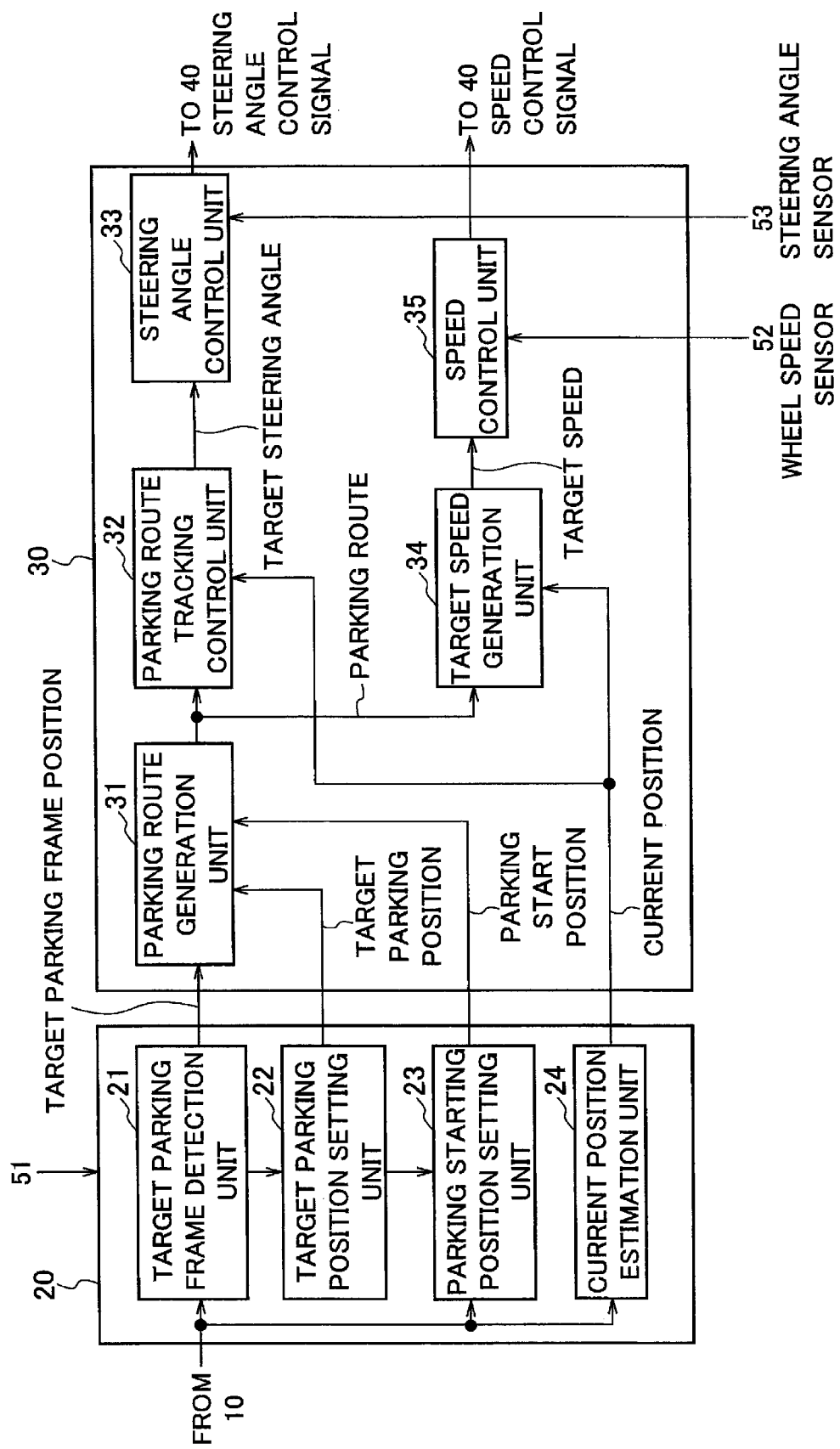
FIG. 2 is the block diagram showing a detailed configuration of an image information processing unit and a parking assist control unit of the parking control device shown in FIG. 1.

FIG. 2 is a block showing a detailed configuration of the image information processing unit 20 and the parking assistance calculation unit 30. The image information processing unit 20 includes a target parking frame detection unit 21, a target parking position setting unit 22, a parking starting position setting unit 23, and a current position estimation unit 24.

The target parking frame detection unit 21 outputs a target parking frame position, which is a position where the host vehicle is parked, using the first frame line and the second frame line detected by the frame line detection circuit 10e. The target parking frame detection unit 21 may detect the first frame line of the free parking space in the direction orthogonal to the vehicle width direction and the second frame line which forms a pair with the first frame line from the image captured by the target parking frame detection sensor 10, and may output the target parking frame position. When a plurality of free parking spaces are detected, a free parking space that is most easily parked (shorter parking time, shorter parking distance, fewer dead angles, etc.) can be used as the target parking frame position.

In addition, the target parking frame position is set by an operation input from the input interface 51, thereby the target parking frame position which is output from the target parking frame detection unit 21 can be changed. For example, it is also possible to stop parking to the target parking frame position, and it is also possible to change to another free parking space among a plurality of the free parking space.

Figure 3:
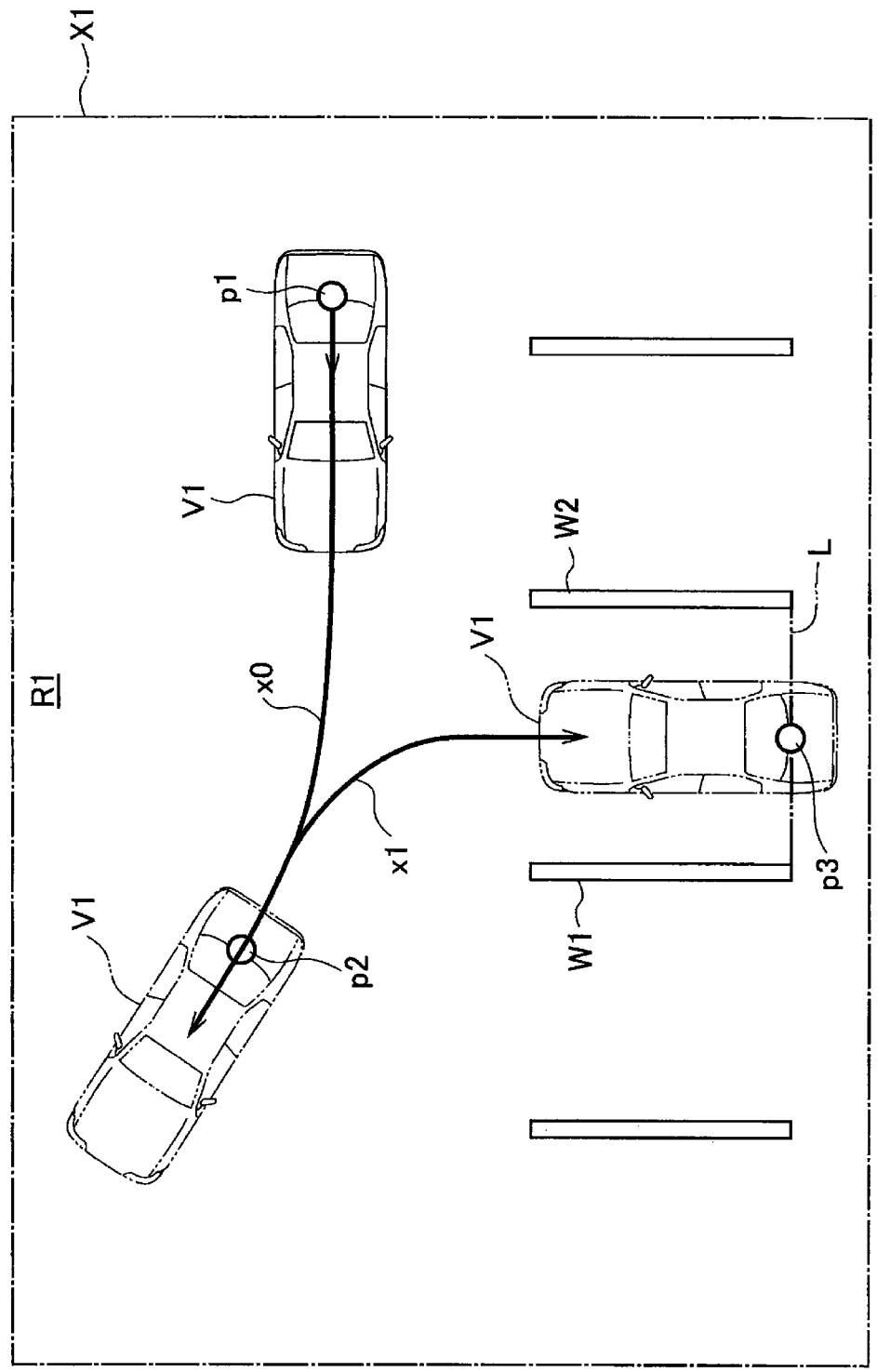
FIG. 3 is a schematic diagram showing a traveling route when a vehicle is moved backward to enter into a free parking space.

FIG. 3 is a schematic diagram showing a traveling route when entering a vehicle V1 into a free parking space. Reference sign X1 in the diagram represents a parking space recognized by the image information processing unit 20. Reference sign R1 represents a traveling lane. The traveling lane R1 in FIG. 3 is set vertical (direction to be orthogonal) to a vehicle front-back direction of the parking space. In addition, the direction of the traveling lane R1 to the parking space in the present embodiment may be arbitrary direction, without regard to the kind of the direction. The target parking frame position output from the target parking frame detection unit 21 includes each coordinate and length of each of the first frame line W1 and the second frame line W2. The coordinate is two-dimensional coordinate on the parking space X1. The first frame line W1 and the second frame line W2 in the diagram show an example in which the vehicle V1 is detected in a position of an initial position p1, for example.

The target parking position setting unit 22 sets a parking target on the straight line L connecting between a point on the first frame line W1 and a point on the second frame line W2. FIG. 3 shows an example in which an end of the wheel at a rear side (rear end of the rear wheel) of the vehicle V1 is matched with the parking target p3. In addition, the position on the vehicle V1 to be matched with the parking target p3 is changed dependent on the length of the first and second frame lines W1 and W2 and a parking method (backward parking or forward parking). The points which extract the straight line L connecting between first and second frame lines W1 and W2 of the parking target p3 are also changed. Such examples to be changed will be mentioned below. In addition, the position on the vehicle V1 to be matched with the parking target p3 may be any position of the rear wheel of the vehicle V1, and may be set to the rear end, the center of the wheel, or a predetermined position from the center of the wheel.

The parking starting position setting unit 23 sets an initial position p1, a parking start position p2, and a parking target p3 from the image captured by the target parking frame detection sensor 10. The parking start position p2 is a turnabout position for guiding the vehicle V1 to the parking target p3, and referred to as a turnabout position p2 hereinafter.

The current position estimation unit 24 estimates the current position of the vehicle V1 from the white line (the first frame line W1, the second frame line W2) captured by the target parking frame detection sensor 10, an object recognition result, and a relative positional relationship of the vehicle V1.

The parking assistance calculation unit 30 (FIG. 2) includes a parking route generation unit 31, a parking route tracking control unit 32, a steering angle control unit 33, a target speed generation unit 34, and a speed control unit 35.

The parking route generation unit 31 generates a parking route for moving the vehicle V1 to the parking target p3 on the basis of the current position (e.g., initial position p1) of the vehicle V1, the turnabout position p2, and the parking target p3. The parking route is a route through which the vehicle V1 can move to the parking target p3, without interfering with an obstacle.

The parking route tracking control unit 32 generates a target steering angle required for moving the vehicle V1 to the parking target p3 on the basis of the parking route and the current position of the vehicle V1.

The steering angle control unit 33 generates a steering angle control signal for controlling the steering angle in accordance with the target steering angle.

The target speed generation unit 34 generates a target speed for moving the vehicle V1 on the basis of the parking route and the current position of the vehicle V1.

The speed control unit 35 generates a speed control signal for controlling the vehicle speed of the vehicle V1 to be the target speed.

The parking route tracking control unit 32, the steering angle control unit 33, the target speed generation unit 34, and the speed control unit 35 which are explained above may generate the steering angle control signal and the speed control signal on the basis of a dead reckoning method, for example.

The dead reckoning method is a method for estimating a position a posture of a vehicle on the basis of a relationship between a travel distance in the center of rear wheel axles and a front wheel steering angle, in a very low speed and front wheel steering vehicle, and is a method useful when traveling in a restricted zone such as a parking operation etc.

The vehicle control ECU 40 controls driving of the actuator 50 configured to control driving, braking, and steering of the vehicle V1 on the basis of the steering angle control signal and the speed control signal.

If the steering angle and the speed are controlled so that the vehicle V1 moves along the parking route generated by the parking route generation unit 31, the vehicle V1 can be parked so that a specific position on the vehicle V1 is matched with the parking target P3.

Figure 4:
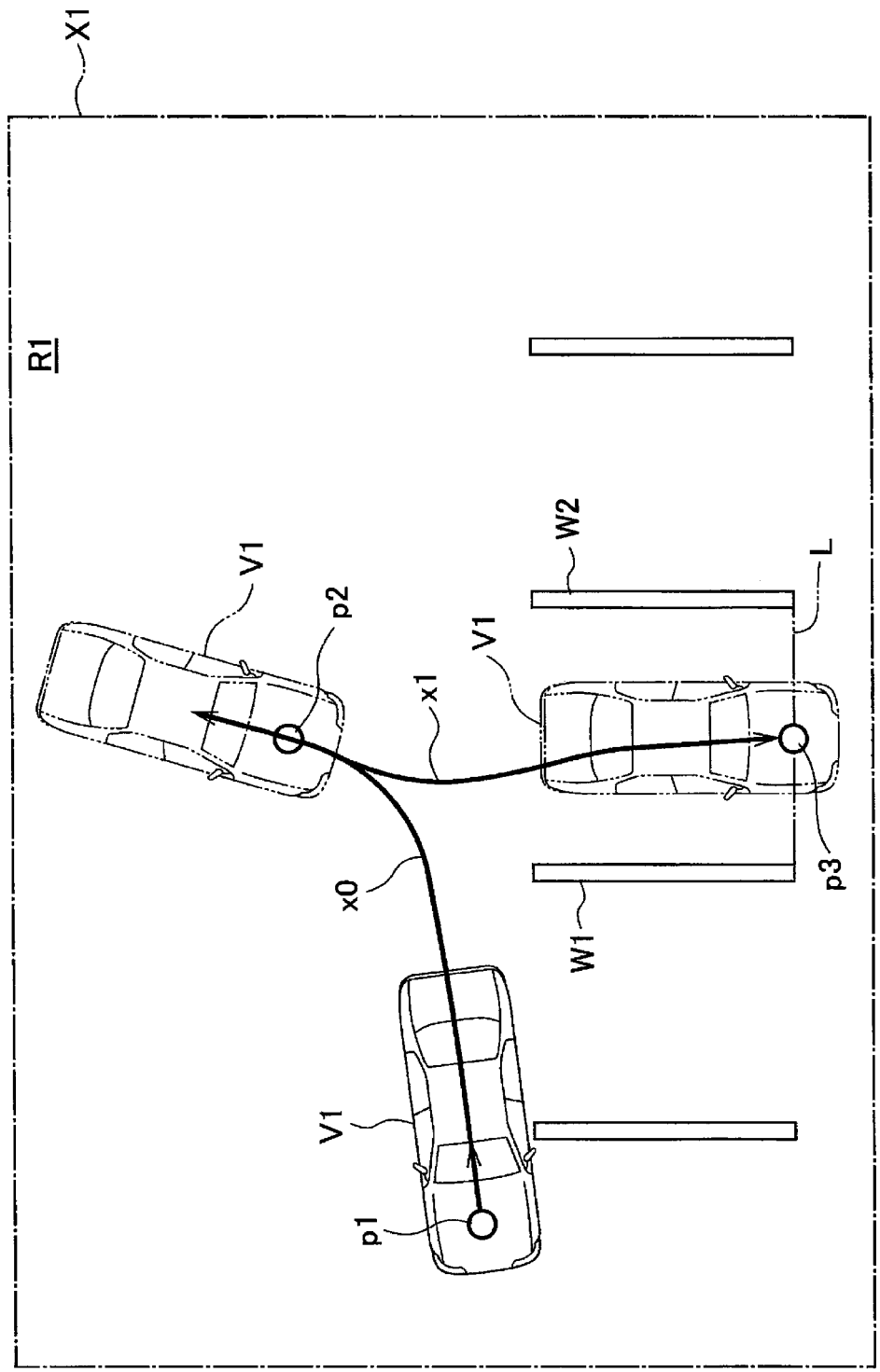
FIG. 4 is a schematic diagram showing a traveling route when the vehicle is moved forward to enter into the free parking space.

FIG. 4 is a schematic diagram showing a traveling route when entering a vehicle V1 into a free parking space by forward parking.

In FIG. 4, a position on the vehicle V1 to be matched with the parking target p3 is set, for example at an end of the wheel of the front (front end of the front wheel) of the vehicle V1.

Accordingly, the parking control is executed so that a position of the front wheel of the vehicle V1 is matched on the straight line L connecting between an end of the first frame line W1 of the far side in the direction into which the vehicle V1 enters and an end of the second frame line (forming a pair with the first frame line) of the far side in the direction into which the vehicle V1 enters.

In addition, the position on the vehicle V1 to be matched with the parking target p3 may be any position of the front wheel of the vehicle V1, and may be set to the rear end, the center of the wheel, or a predetermined position from the center of the wheel.

Thus, the position on the vehicle V1 to be matched with the parking target p3 is changed between the backward parking and the forward parking (depending on the parking method). Moreover, the position of the straight line L connecting between the first frame line W1 and the second frame line W2 to which the parking target p3 is set is also changed. Specific examples thereof will be mentioned below.

Next, an operation of the parking control device 100 according to the present embodiment configured as mentioned above will be explained with reference to the flow chart showing in FIG. 5, and FIG. 3.

The vehicle V1 moving at a low speed or stopping at the initial position p1 on the parking space X1 searches for a free parking space (Step S1). When the target parking frame detection sensor 10 of the vehicle V1 detects an free parking space (YES in Step S2), the image information processing unit 20 determines a parking method and a target parking frame position (Step S3).

The image information processing unit 20 may automatically determine the parking method and the target parking frame position, or may determine them on the basis of the operation input from the input interface 51.

The parking assistance calculation unit 30 generates a parking route for moving the vehicle V1 to the parking target p3 on the basis of the initial position p1, the turnabout position p2, and the parking target p3 generated by the image information processing unit 20 (Step S4). Then, the parking control is started (Step S5).

The parking assistance calculation unit 30 changes the steering angle control signal and the speed control signal so that the position of the vehicle V1 is reached to the turnabout position p2 (NO in Step S6).

When the position of the vehicle V1 reaches the turnabout position p2 (YES in Step S6), the vehicle control ECU 40 switches a shift position to R range (Step S7).

When the shift position is switched to R range, the parking control device 100 redetects the first frame line W1 and the second frame line W2 that are being detected, and resets the parking target p3 (Step S9).

Then, the parking control device 100 controls each of the steering angle control signal and the speed control signal so that the position on the vehicle V1 is matched with the parking target p3 (Step S10). The processes of steps S9 to S10 are repeated until the position on the vehicle V1 reaches the parking target p3 (NO in Step S11).

The processes of steps S9 to S10 are executed in the unit of a frame rate at which the target parking frame detection sensor 10 captures one image, for example. That is, the steering angle control signal and speed control signal for guiding the vehicle V1 to the parking target p3 are set in real time.

When the position on the vehicle V1 reaches the parking target p3 in accordance with the steering angle control signal and speed control signal which are controlled in real time (YES in Step S11), the shift position is switched to P range and the parking assistance control is completed (Step S12).

Next, the real-time control for reducing a difference between the parking route and the traveling route of the vehicle V1 will be explained. As a factor of the difference between the parking route and the traveling route, there are four factors, "A: free running distance generated the vehicle is stopped", "B: following delay of the steering angle", "C: steady-state deviation of the steering angle", and "D: detection error of the target parking frame detection sensor 10." A method for reducing each influence will be explained in detail.

"A: Free Running Distance Generated the Vehicle is Stopped"

FIG. 6 shows changes of the speed control signal with respect to a traveling position for making the vehicle V1 to travel along the parking route.

Figure 6A:
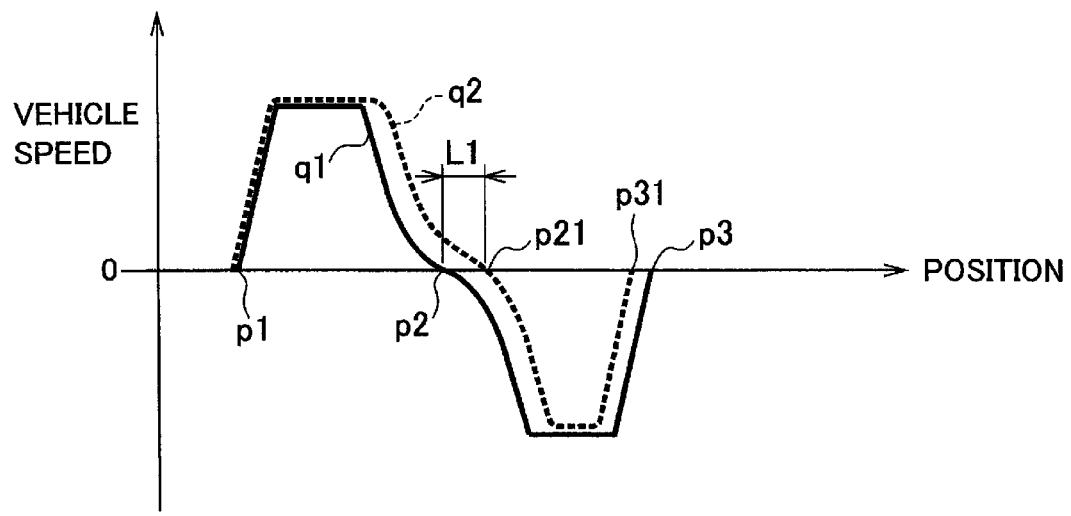
FIG. 6A is a graphic chart showing a relationship between a position and a vehicle speed along a target route when parking a vehicle in a free parking space, showing changes in a target speed and an actual speed.

In FIG. 6A, the horizontal axis represents a position of a vehicle V1, and the vertical axis represents a target speed q1 (solid line) and an actual speed q2 (dashed line) of the vehicle V1. Reference sign p1 shown on the horizontal axis corresponds to the initial position p1 shown in FIG. 3, reference sign p2 corresponds to the turnabout position p2, and reference sign p3 corresponds to the parking target p3.

As the target speed q1, a target speed in the forward direction is set in a route from the initial position p1 to the turnabout position p2 (x0 in FIG. 3). Moreover, a target speed in the backward direction is set in a route from the turnabout position p2 to the parking target p3 (x1 in FIG. 3). The target speed q1 has a pattern from which the target speed is changed in a ramp state in accordance with the position of the vehicle V1.

As shown in FIG. 6A, when traveling from the initial position p1 to the turnabout position p2, the actual speed q2 is changed by following the target speed q1. However, when stopping at the turnabout position p2, the target speed q1 may be unable to be followed and then the vehicle V1 is free running. That is, since the actual speed q2 is not zero but free running is performed when the vehicle V1 reaches the turnabout position p2, the actual speed q2 becomes zero in a position p21 which passes by the free running distance ("L1"). The free running distance L1 can be calculated on the basis of the detected information from the steering angle sensor 53.

If the vehicle V1 performs free running, the vehicle V1 stops at the position p21 which passes the turnabout position p2. Therefore, if the vehicle V1 is moved backward without correcting this free running distance L1, the vehicle V1 originally should be moved backward along the parking route x1 to reach the parking target p3, but the vehicle V1 is moved backward along a route x2 different from the parking route x1. Consequently, the vehicle V1 reaches at a position p31 different from the parking target p3.

Figure 6B:
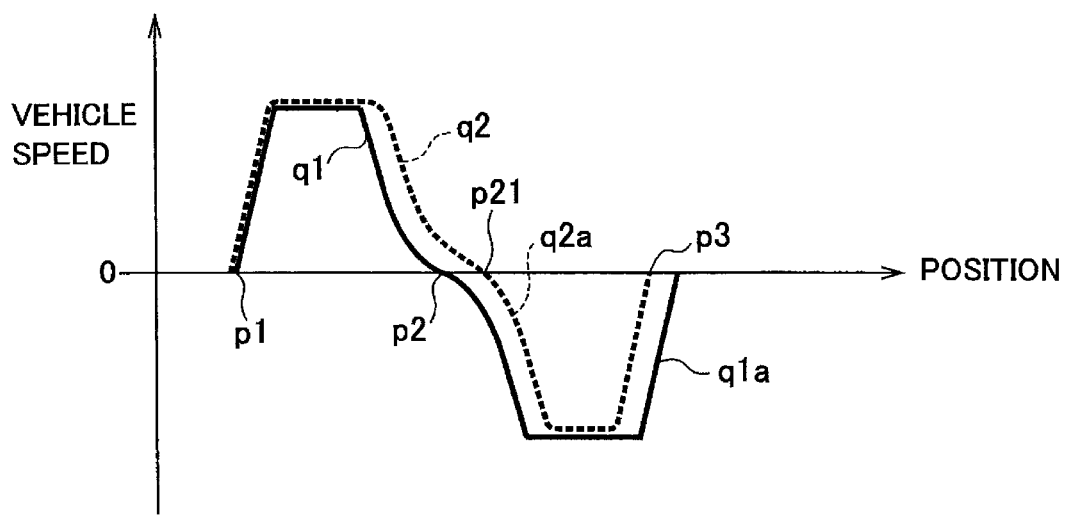
FIG. 6B is a graphic chart showing a relationship between a position and a vehicle speed along a target route when parking a vehicle in a free parking space, showing changes in a corrected target speed and an actual speed.

Accordingly, the target speed q1 when the vehicle V1 is moved backward is corrected on the basis of the free running distance L1, and thereby the corrected target speed q1a is set as shown in FIG. 6B. The corrected target speed q1a is set so that the distance at the time of moving backward become long only by the free running distance L1. The deviation between the parking route and the traveling route generated due to the free running distance L1 can be corrected by setting the corrected target speed q1a, and thereby the vehicle V1 can be made to reach the parking target p3. Reference sign q2a shown in FIG. 6B is the actual speed q2a with respect to the corrected target speed q1a.

Figure 7:
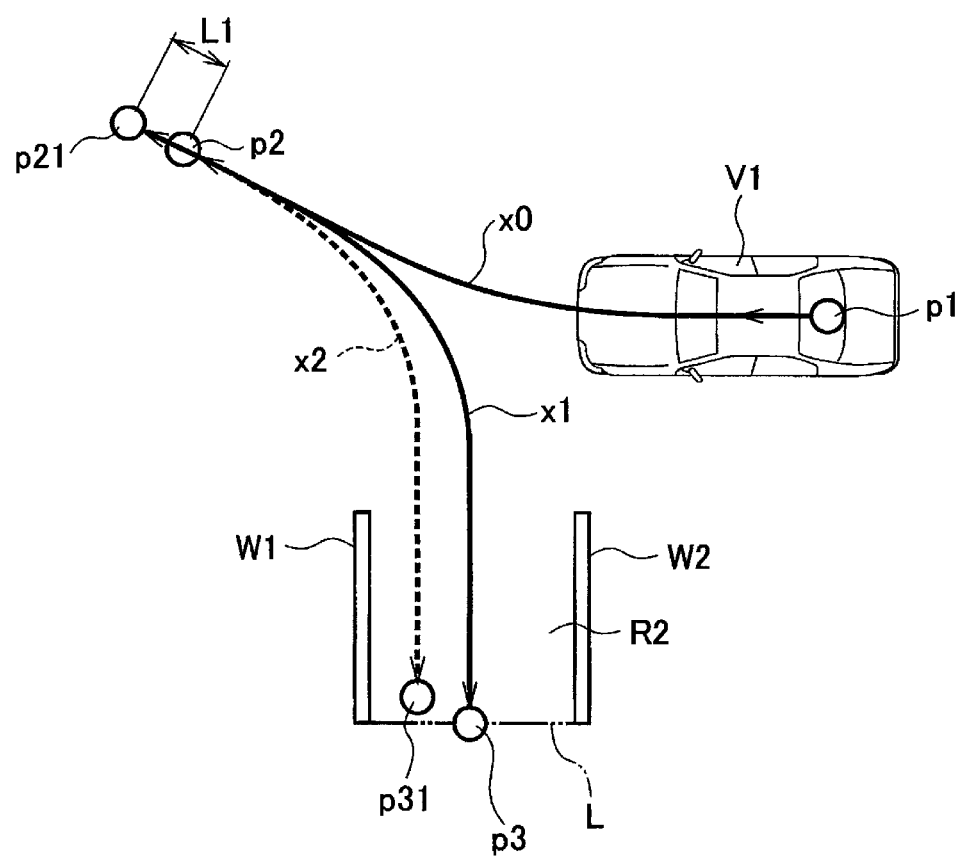
FIG. 7 is an explanatory diagram showing a target route when moving a vehicle to a target parking position from an initial position, and a traveling route when a deviation due to free running distance occurs.

FIG. 7 is a diagram showing the explanation explained above in planar view. Even if the free running distance L1 is generated when the vehicle V1 stops, since the moving backward of the vehicle V1 is controlled by the fundamental control signal after the vehicle V1 is moved backward by the same distance as the free running distance L1 (i.e., after returning from the position p21 to the turnabout position p2), the vehicle V1 can be parked at the position of the parking target p3. In addition, the steering angle when the vehicle V1 returns from the position p21 to the turnabout position p2 is set as the same steering angle as the steering angle at the time of the free running.

"B: Following Delay of the Steering Angle"

Next, the steering angle control of the vehicle V1 will be explained.

Figure 8A:
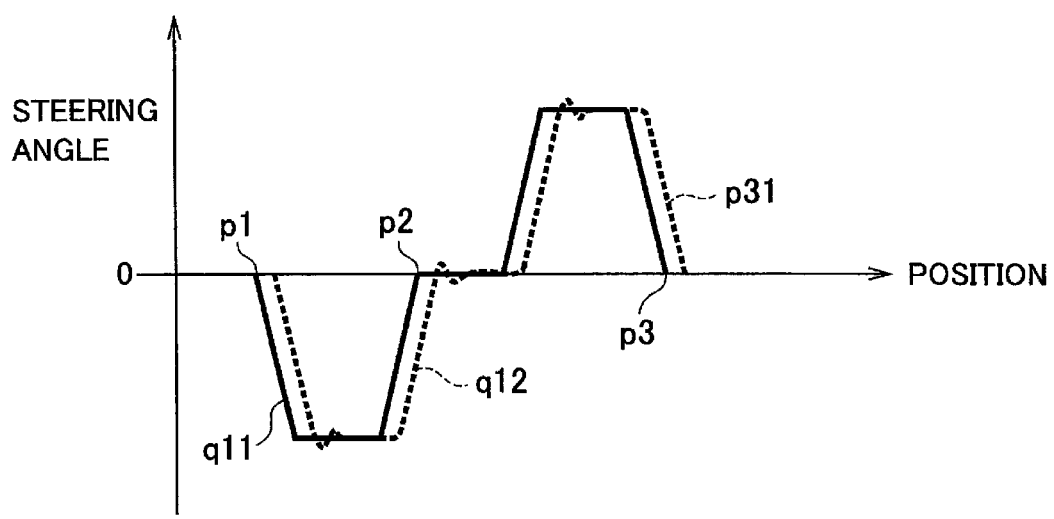
FIG. 8A is a graphic chart showing a relationship of a position and a steering angle along a target route when parking a vehicle in a parking area, showing changes in a target steering angle and an actual steering angle.

FIG. 8A shows a graphic chart showing changes in the steering angle with respect to the position of the vehicle V1, the curved line q11 indicates a target steering angle when making the vehicle to travel along the parking route, and the curved line q12 indicates an actual steering angle. The curved line q11 indicating the target steering angle is a steering pattern based on the clothoid curve, and an inclination of the amount of variation of the steering angle is set to be a value in consideration of an operating limit of a steering actuator. Then, the target steering angle q11 is set when controlling the steering angle of the vehicle V1, and thereby it will follow with a certain amount of delay in accordance with the dynamics of the steering angle based. That is, the actual steering angle q12 is set at a position slightly deviated with respect to the target steering angle q11.

Figure 9:
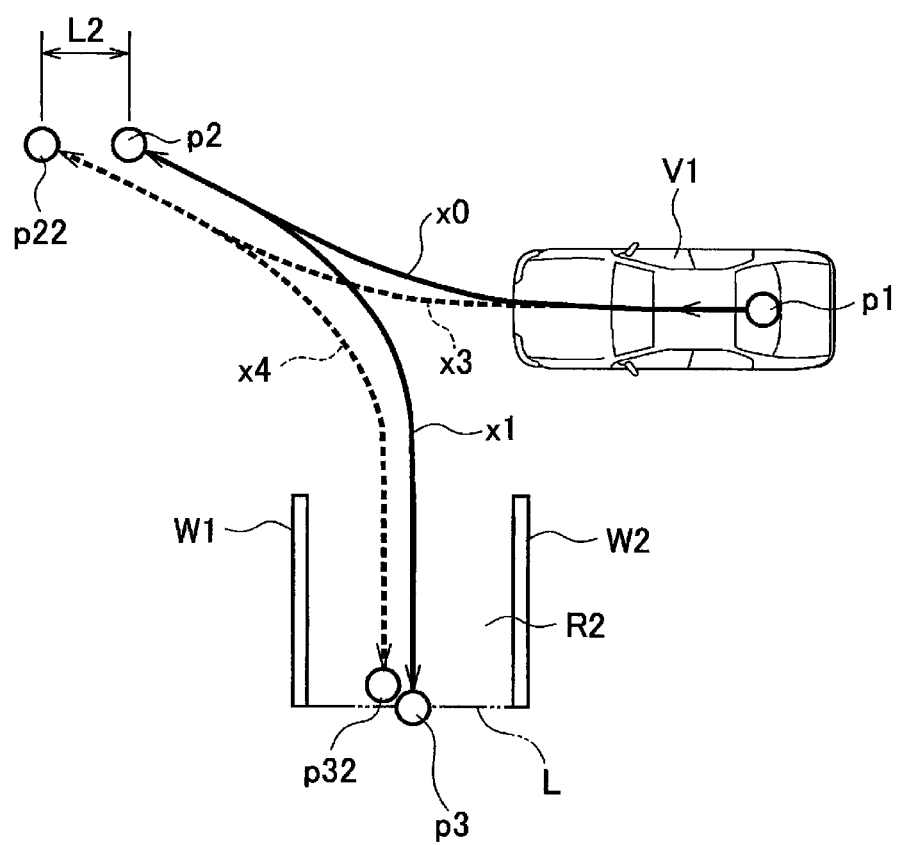
FIG. 9 is an explanatory diagram showing a target route when moving a vehicle to a target parking position from an initial position, and a traveling route when a deviation due to following delay of a steering angle occurs.

Consequently, as shown in FIG. 9, when traveling from the initial position p1 to the turnabout position p2, the steering angle control is delayed and the curvature radius of the traveling route is increased. Specifically, since it will travel the route x3 and will stop at a position p22, the position p22 is a position deviated from the turnabout position p2 by only the distance L2. Then, when the vehicle V1 is moved backward from this position p22, the vehicle V1 will be moved backward along a route x4, and will be stopped at a position p32. That is, the vehicle V1 cannot be stopped at the parking target p3.

Figure 8B:
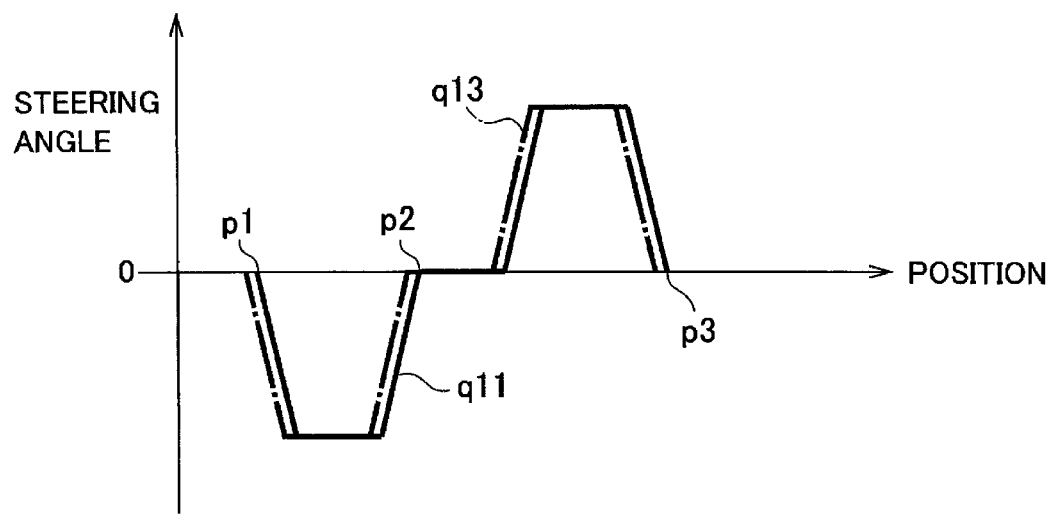
FIG. 8B is a graphic chart showing a relationship of a position and a steering angle along a target route when parking a vehicle in a parking area, showing changes in a target steering angle and a corrected target steering angle.

In the present embodiment, as shown in FIG. 8B, in consideration of such a following delay of the steering angle, the timing of the steering angle control is previously set so as to be slightly earlier. In other words, a corrected target steering angle q13 is set so that the steering angle is change at a nearer position with respect to the target steering angle q11. Then, the actual steering angle to substantially be matched with the actual steering angle q11 can be obtained by controlling the traveling of the vehicle V1 using this corrected target steering angle q13. Accordingly, the vehicle V1 can be reached to the turnabout position p2 along the target route x0 shown in FIG. 9, and further the vehicle V1 can be moved to the parking target p3 along the parking route x1.

"C: Steady-State Deviation of the Steering Angle"

Figure 10A:
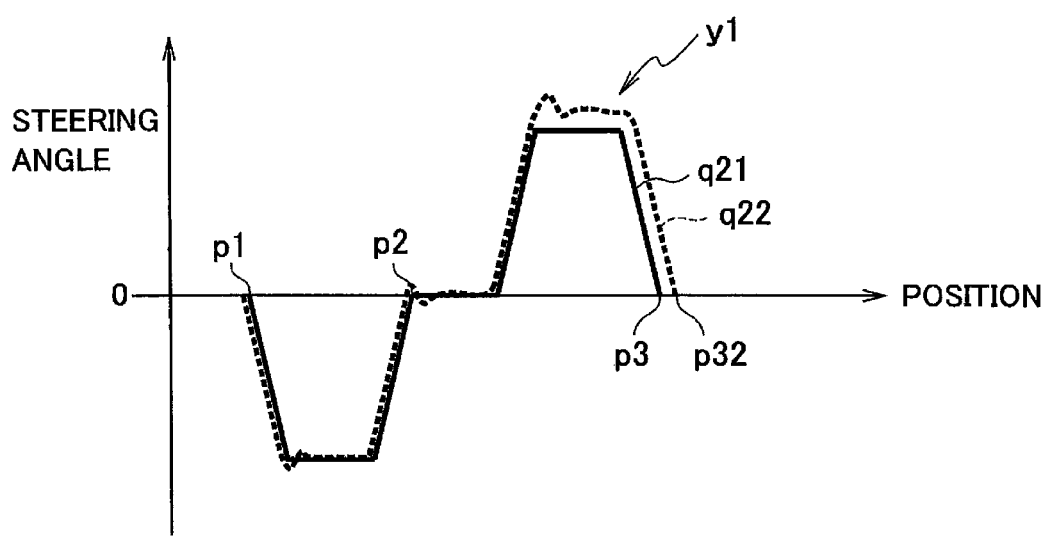
FIG. 10A is a graphic chart showing a relationship of a position and a steering angle along a target route when parking a vehicle in a parking space, showing changes in a target steering angle and an actual steering angle when a steady-state deviation occurs.

In the steering angle control of the vehicle V1, deviation may be generated between the target steering angle and the actual steering angle by steady-state deviation of the steering angle, in addition to the above-mentioned following delay. Hereinafter, such deviation will be explained with reference to FIG. 10. FIG. 10A shows a graphic chart showing changes in the target steering angle q21 with respect to the position of the vehicle V1, and changes in the actual steering angle q22 when steady-state deviation are generated. In FIG. 10, the following delay of the steering angle is not considered.

As shown in reference sign y1, when steady-state deviation is generated, the actual steering angle q22 is increased with respect to the target steering angle q21. Accordingly, when the vehicle V1 is moved backward from the turnabout position p2, the vehicle V1 cannot be moved backward along the parking route x1.

Figure 10B:
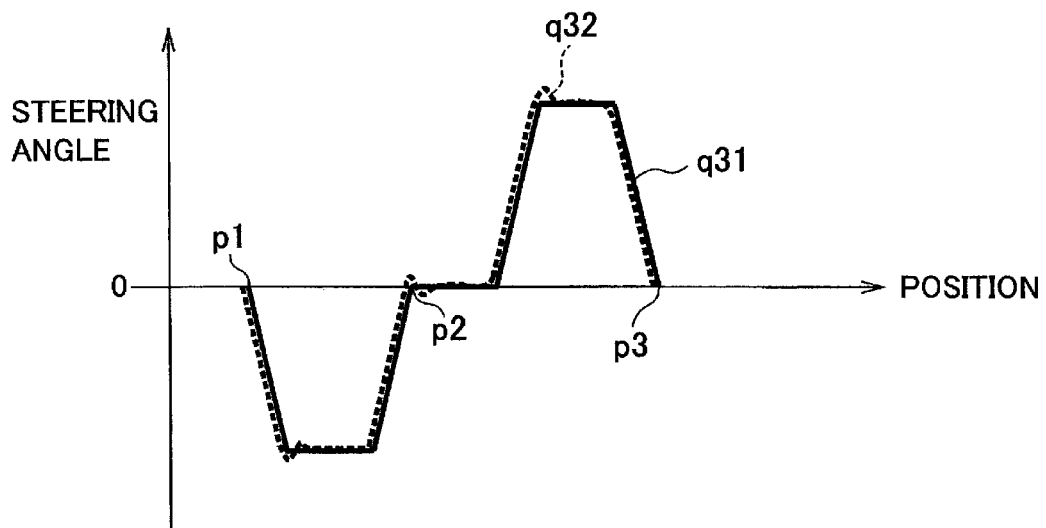
FIG. 10B is a graphic chart showing a relationship of a position and a steering angle along a target route when parking a vehicle in a parking space, showing changes in a corrected target steering angle and an actual steering angle when applying the corrected target steering angle.

In the present embodiment, in a position where the steady-state deviation is generated, the target steering angle q21 is corrected in consideration of the steady-state deviation, and the corrected target steering angle q32 shown in FIG. 10B is set. By setting in this way, even when steady-state deviation is generate, the target steering angle is corrected in anticipation of the amount of deviation of the steering angle caused thereby. Accordingly, an actual steering angle to be substantially matched with the target steering angle can be obtained. Accordingly, the vehicle V1 can be moved along the parking routes x0 and x1 with high accuracy, thereby and the vehicle V1 can be parked at the parking target p3.

"D: Detection Error of the Target Parking Frame Detection Sensor 10"

The target parking frame detection sensor 10 detects a free parking space, the target parking position setting unit 22 sets a parking target, and the parking route generation unit 31 generates a route to the set parking target. At the time of setting the parking target, the position of the parking target may be erroneously detected, when there is distance between the parking target and the vehicle V1, when an environment of a parking lot is wrong (e.g., rainfall, nighttime), when a free parking space is surrounded by parked vehicles or obstacles (e.g., posts, walls of the parking lot), or the like. Therefore, a new parking target may be detected in the process of being parked towards the parking target. In this case, the vehicle can be parked so as to be close to the true parking target by setting the target parking route to the detected new parking target and adjusting the control content in real time.

[Explanation of Processing Operation]

Figure 11:
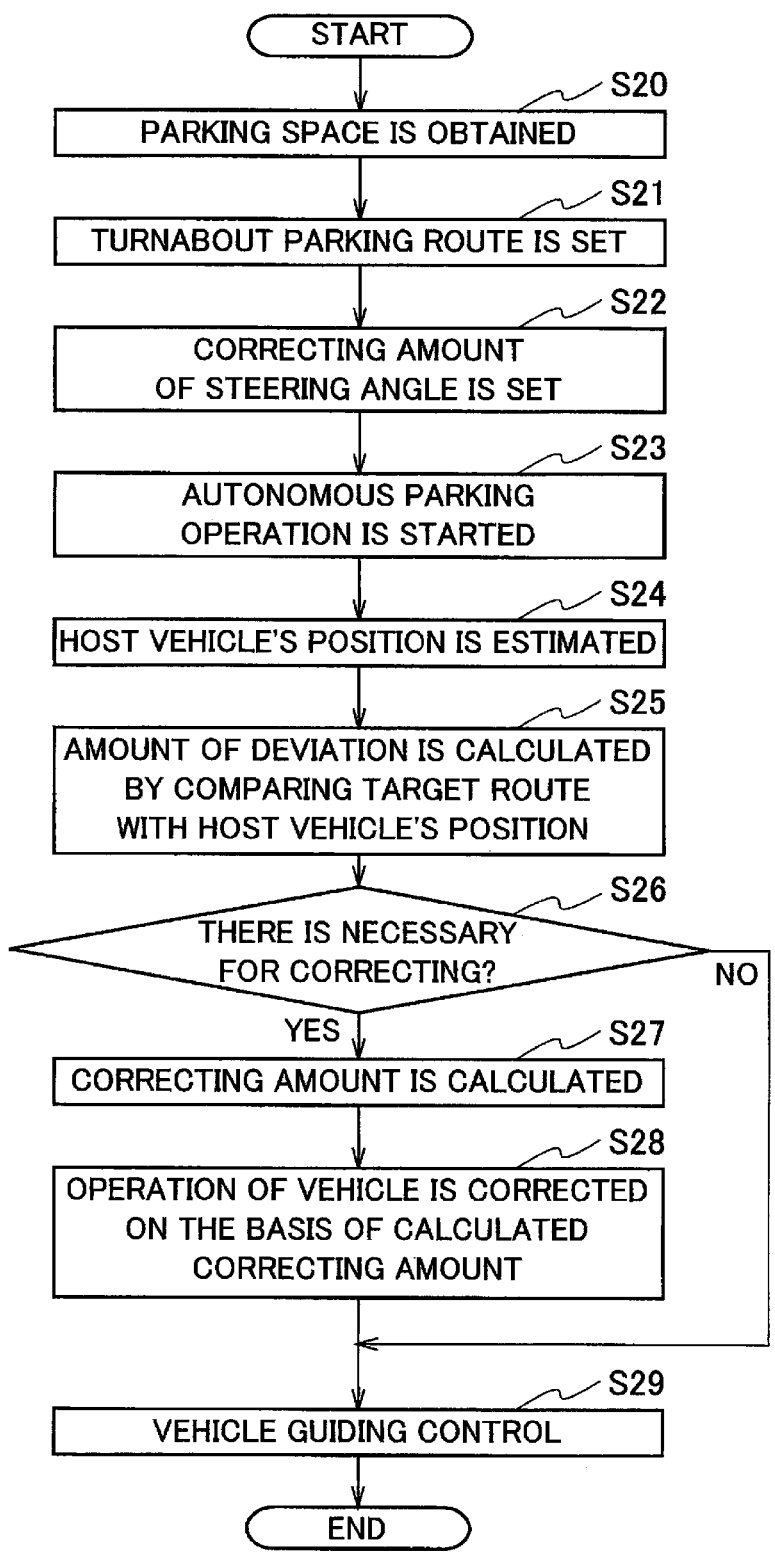
FIG. 11 is a flow chart showing a processing procedure of the parking control device according to the embodiment of the present invention.

Next, a processing procedure of the parking control device 100 according to the present embodiment will be explained, with reference to the flow chart shown in FIG. 11. This process is executed for each operation period which is previously set.

First, in Step S20, the image information processing unit 20 obtains a parking space X1 on the basis of information detected by the target parking frame detection sensor 10. Specifically, as shown in FIG. 3, the parking space X1 which is an area where the vehicle V1 can travel is obtained.

In Step S21, the parking route generation unit 31 sets a turnabout position p2 for parking the vehicle and a parking target p3 in a range which is not deviated from the parking space X1. Furthermore, the parking route generation unit 31 sets a traveling route until the vehicle V1 in the initial position p1 is reached to the target parking position p3 through the turnabout position p2, in the area of the parking space X1. Consequently, the parking routes x0 and x1 shown in FIG. 3 are set.

In Step S22, the parking route tracking control unit 32 calculates a correction amount of the target steering angle so that the vehicle V1 travels along the parking routes x0 and x1 shown in FIG. 3. Since this correction amount can be calculated on the basis of the parking routes x0 and x1, it can be set at the at the time before the vehicle V1 is started forward from the initial position p1. Consequently, the corrected target steering angle q13 shown in FIG. 8B or the corrected target steering angle q31 shown in FIG. 10B is set. For example, if a following delay of the actual steering angle with respect to the target steering angle is generated, the corrected target steering angle q13 is set, or if deviation due to the steady-state deviation of the actual steering angle is generated, the corrected target steering angle q31 is set. Moreover, if deviation due to the influences of both is generated, the corrected target steering angle for correcting both amount of deviation is set.

In Step S23, a vehicle speed is output from the speed control unit 35, a control command of the steering angle is output from the steering angle control unit 33, and the autonomous parking operation of the vehicle V1 is started by control of the vehicle control ECU 40. Accordingly, the vehicle V1 is started forward along the parking route x0 from the initial position p1 shown in FIG. 3.

In Step S24, the current position estimation unit 24 estimates a position of the vehicle V1 on the basis of an image of a periphery thereof captured by the target parking frame detection sensor 10. In addition, the vehicle speed information and the steering angle information respectively detected by the wheel speed sensor 52 and the steering angle sensor 53 may be used for the estimation of the position of the vehicle V1.

In Step S25, the parking route tracking control unit 32 calculates an amount of the deviation by comparing the parking route x0 with the self-position estimated by the current position estimation unit 24. For example, when the vehicle is to be stopped at the turnabout position p2, the vehicle is not always be securely stopped at this turnabout position p2, and may be moved to a position where the vehicle V1 exceeds the turnabout position p2 due to free running. The parking route tracking control unit 32 calculates an amount of the deviation between the both at this case. Specifically, the free running distance L1 shown in FIG. 7 is calculated.

In Step S26, the parking route tracking control unit 32 and the target speed generation unit 34 determine whether a correction is necessary or not. For example, when the amount of deviation is smaller than a threshold value which is previously set, it can be determined that there is no problem without correcting the amount of deviation. Accordingly, when the amount of deviation is larger than the threshold value, it is determined that correction is necessary. When it is determined that there is no necessary for correcting, the process is advanced to Step S29 (NO in step S26).

When it is determined that there is necessary for correcting (YES in Step S26), the parking route tracking control unit 32 and the target speed generation unit 34 calculate the correcting amount, in step S27. In this process, the correcting amount of the steering angle set by the process in Step S22 and the free running distance L1 (amount of deviation) calculated by the process in Step S25 are used as the correcting amount. In addition, the correcting amount of the steering angle and the correcting amount in accordance with the free running distance L1 may be set in real time.

In Step S28, the steering angle control unit 33 and the speed control unit 35 generate a speed control signal to which the operation of the vehicle V1 is corrected on the basis of the calculated correcting amount, to be output to the vehicle control ECU 40. For example, as shown in FIG. 7, when the vehicle V1 is stopped at the position p21 deviated by the free running distance L1, the control signal of the vehicle V1 is corrected so as to be moved by the same reverse distance as this free running distance L1. Accordingly, after the vehicle V1 is moved from the position p21 to the turnabout position p2, fundamental control of backward parking will be implemented. Furthermore, the target steering angle is corrected on the basis of the correcting amount of the steering angle.

In Step S29, guidance control of the vehicle by the vehicle control ECU 40 is implemented. Consequently, the vehicle V1 travels along the parking routes x0 and x1, and can be securely stopped at the parking target p3.

In this way, in the parking control device 100 according to the present embodiment, since the amount of deviation of the current position of the vehicle and the position in the target route is calculated and the target speed and the target steering angle are corrected so that the amount of deviation is reduced, the vehicle V1 can be parked so that the position on the vehicle V1 is matched with the parking target p3 with high accuracy.

[Specific Example of Parking Target p3]

The parking assistance method according to the present embodiment detects a first frame line W1 of free parking space in a direction orthogonal to a vehicle width direction and a second frame line W2 which forms a pair with the first frame line W1, and sets a parking target p3 on the straight line connecting between a point on the first frame line W1 and a point on the second frame line W2. A position of the parking target p3 is changed in accordance with the lengths of the first and second frame lines W1 and W2, or the like. Next, a specific example will be explained.

Figure 5:
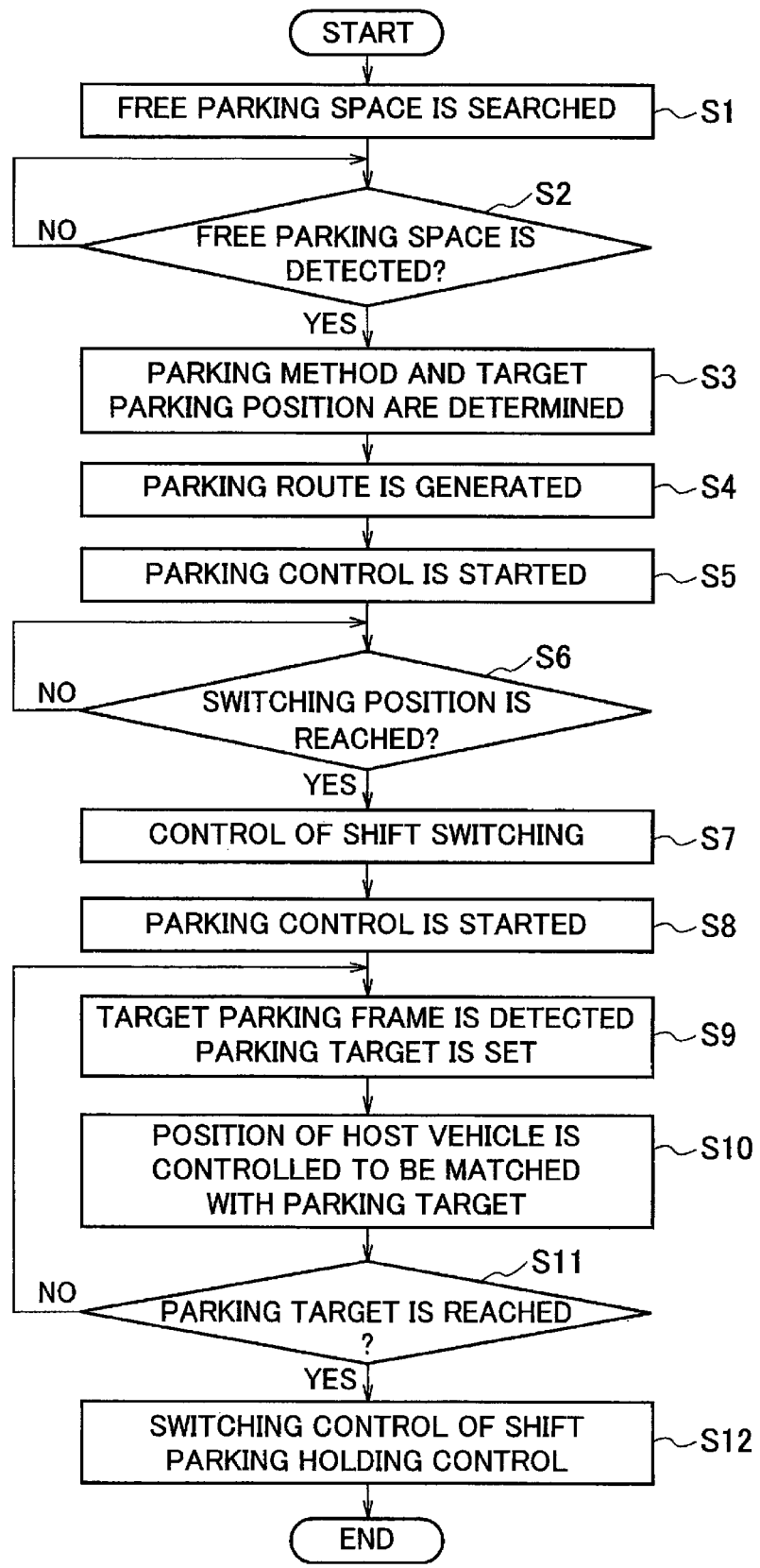
FIG. 5 is a flow chart showing a processing procedure of the parking control device shown in FIG. 1.

FIG. 12 is a detailed flow chart of a process for setting the parking target p3 (FIG. 5: Step S9). The parking control device 100 searches for the first frame line W1 and the second frame line W2 of the free parking space, when the parking control is started (Step S90). If no first and second frame lines W1 and W2 can be detected, the parking assistance control using the frame lines is stopped. In this case, a conventional general parking control is executed.

When the first frame line W1 and the second frame line W2 of the free parking space can be detected (YES in Step S90), it is determined whether a angle between the straight line connecting between the end of the first frame line W1 and the end of the second frame line W2, and the first frame line W1 or the second frame line W2 is near right-angled (Step S91).

When the angle between the straight line and the first frame line W1 or the second frame line W2 is near right-angled (YES in Step S91), next, it is determined whether the lengths of the first and second frame lines W1 and W2 are longer than the total length of the vehicle V1 (host vehicle) (Step S92).

(Length of Frame Line>Vehicle Length)

FIG. 13 is a planar view diagram showing a parking space and a vehicle V1 when the lengths of the first and second frame lines W1 and W2 are longer than the total length of the vehicle V1 (host vehicle) (YES in Step S92). In this case, the parking target p3 is set on the straight line L which connects between the end of the near side of the first frame line W1 in a direction into which the host vehicle enters and the end of the near side of the second frame line W2 in the direction into which the host vehicle enters.

Figure 13A:
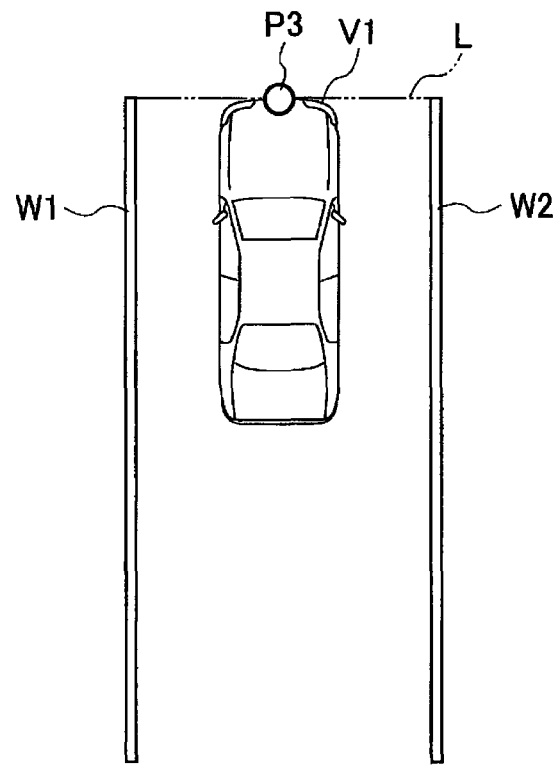
FIG. 13A is a planar view of a parking space and a vehicle when the lengths of first and second frame lines are longer than the total length of the vehicle (host vehicle), and is a diagram showing a case of backward parking.

FIG. 13A shows a case of backward parking. In this case, the parking target p3 is set on the straight line L connecting between the ends of the first and second frame lines W1 and W2 of the near side into which the host vehicle enters, and the parking control is executed so that an end (front edge) of a side opposite to the travelling direction of the host vehicle is matched with the parking target p3 (Step S94).

Figure 13B:
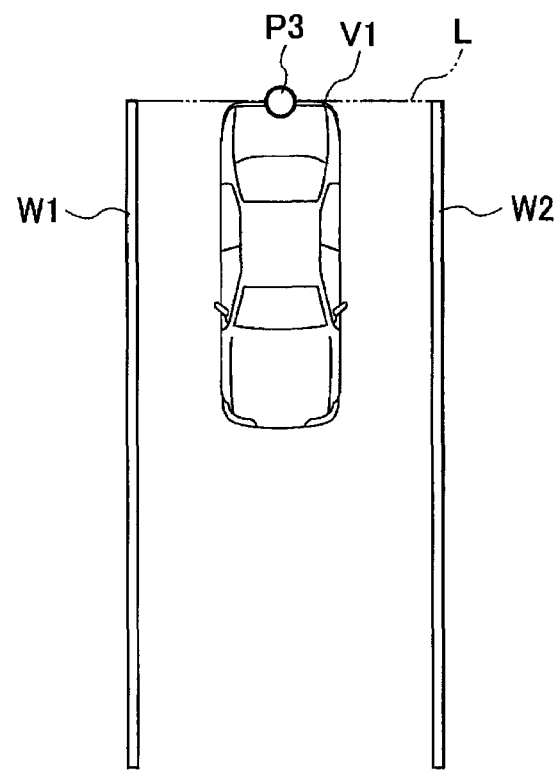
FIG. 13B is a planar view of a parking space and a vehicle when the lengths of first and second frame lines are longer than the total length of the vehicle (host vehicle), which is a diagram showing a case of forward parking.

FIG. 13B shows a case of forward parking. Also in this case, the parking target p3 is set on the straight line L connecting between the ends of the first and second frame lines W1 and W2 of the near side into which the host vehicle enters. Then, the parking control is executed so that an end (rear edge) of a side opposite to the travelling direction of the host vehicle is matched with the parking target p3 (Step S94).

Consequently, the vehicle V1 is not projected from the straight line L connecting between the ends of the first frame line W1 and the second frame line W2 of the near side into which the host vehicle enters, also in the cases of both of the backward parking and the forward parking. That is, the vehicle V1 can be parked within the frame line.

(Length Frame Line<Wheel Base_(1))

When the lengths of the first and second frame lines W1 and W2 are shorter than the total length of the vehicle V1 (host vehicle) (NO in Step S92), next, it is determined whether the lengths of the first and second frame lines W1 and W2 are longer than the wheel base of the vehicle V1 (Step S95).

When the lengths of the first and second frame lines W1 and W2 are shorter than the wheel base of the vehicle V1 (YES in Step S95) next, it is determined whether the lengths of the first and second frame lines W1 and W2 are equal to or greater than a predetermined length (Step S96).

The predetermined length is approximately 50 cm in length, for example. When the first and second frame lines W1 and W2 are 50 cm or more in the length, for example and are shorter than the wheel base (YES in Step S96), the frame lines represent only the widthwise direction of the vehicle V1 in the parking space, and are drawn on the center portion in the depth direction of the parking space in many cases.

FIG. 14 is a planar view diagram showing a parking space and a vehicle V1 when the lengths of the first and second frame lines W1 and W2 are shorter than the wheel base of the vehicle V1 (host vehicle) (YES in Step S95). In this case, the parking target p3 is set on the straight line L which connects between the center of the first frame line W1 and the center of the second frame line (Step S97).

Figure 14A:
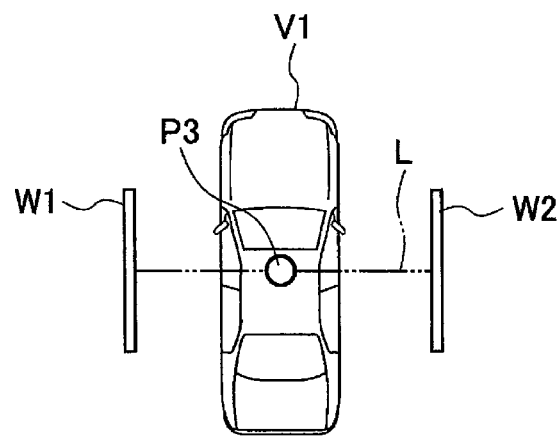
FIG. 14A is a planar view of a parking space and a vehicle when the lengths of first and second frame lines are shorter than a wheel base of the vehicle (host vehicle), and is a diagram showing a case of backward parking.

FIG. 14A shows the case of backward parking, and the parking target p3 is set on the straight line L which connects between the respective centers of the first frame line W1 and the second frame line W2 in this case. Moreover, the parking control is executed so that the parking target p3 and a position of the center of the host vehicle is matched with each other (Step S98). In this case, the front of the vehicle V1 is positioned at the near side in the direction into which the host vehicle enters.

Figure 14B:
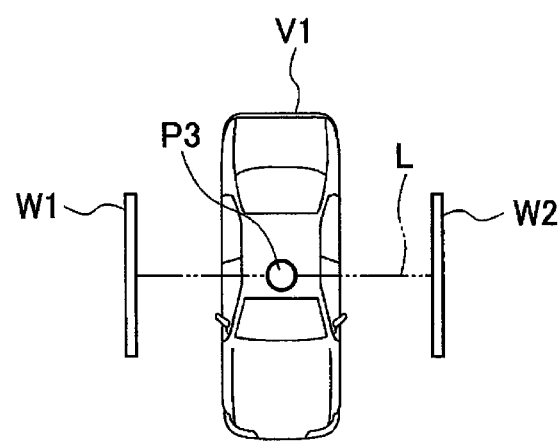
FIG. 14B is a planar view of a parking space and a vehicle when the lengths of first and second frame lines are shorter than a wheel base of the vehicle (host vehicle), and is a diagram showing a case of forward parking.

FIG. 14B shows the case of forward parking. Also in this case, the parking target p3 is set on the straight line L which connects between the respective centers of the first frame line W1 and the second frame line W2. Moreover, the parking control is executed so that the position of the parking target p3 and a position of the center of the host vehicle is matched with each other (Step S98). In this case, the rear of the vehicle V1 is positioned at the near side in the direction into which the host vehicle enters.

Consequently, the length of the vehicle V1 projected from the first frame line W1 and the second frame line W2 is the same length between the front side and the rear side. Accordingly, the vehicle V1 can be parked at a well-balanced position with respect to the first and second frame lines W1 and W2.

(Length Frame Line<Wheel Base_(2))

When the lengths of the first and second frame lines W1 and W2 are shorter than the total length of the vehicle V1 (host vehicle) (NO in Step S92), next, it is determined whether the lengths of the first and second frame lines W1 and W2 are longer than the wheel base of the vehicle V1 (Step S95).

When the lengths of the first and second frame lines W1 and W2 are shorter than the wheel base of the vehicle V1 (YES in Step S95) next, it is determined whether the lengths of the first and second frame lines W1 and W2 are equal to or greater than a predetermined length (Step S96).

The predetermined length is approximately 50 cm in length, for example. When the first and second frame lines W1 and W2 are 50 cm or more in the length, for example and are shorter than the wheel base (YES in Step S96), the frame lines may represent only the widthwise direction of the vehicle V1 in the parking space.

In this case, the parking target p3 is set on the straight line L which connects between the end of the first frame line W1 and the end of the second frame line (Step S97).

Moreover, when the lengths of the first and second frame lines W1 and W2 are shorter than the wheel base of the vehicle V1, the parking control is executed so that the position of the wheel of the host vehicle is matched with the parking target p3 set on the straight line L connecting between the end of the first frame line W1 and the end of the second frame line.

Thereby, the projecting from the first frame line W1 and the second frame line W2 of the vehicle V1 can be distinguished between the front side and the rear side, it is possible to suppress the largely projection of any one of the front side or the rear side.

Moreover, when the lengths of the first and second frame lines W1 and W2 are shorter than the wheel base of the vehicle V1, the parking direction of the host vehicle with respect to the free parking space is determined, and if the parking direction of the host vehicle is backward parking, the parking control is executed so that the position of the rear wheel of the host vehicle is matched with the parking target p3. In this case, the front of the vehicle V1 is positioned at the near side in the direction into which the host vehicle enters.

Thereby, when the lengths of the first and second frame lines W1 and W2 are shorter than the wheel base of the vehicle V1, since the control is executed so that the position of the rear wheel of the host vehicle is matched with the parking target p3, the projecting from the first frame line W1 and the second frame line W2 of the vehicle V1 can be distinguished between the front side and the rear side, it is possible to suppress the largely projection of any one of the front side or the rear side.

In addition, when the lengths of the first and second frame lines W1 and W2 are shorter than the wheel base of the vehicle V1, the parking direction of the host vehicle with respect to the free parking space is determined, and if the parking direction of the host vehicle is backward parking, the parking control can be executed so that the position of the rear wheel of the host vehicle is matched with the parking target p3. Thus, in backward parking, the vehicle V1 can be parked at a well-balanced position with respect to the first and second frame lines W1 and W2.

Moreover, when the lengths of the first and second frame lines W1 and W2 are shorter than the wheel base of the vehicle V1, The parking direction of the host vehicle with respect to the free parking space is determined, and if the parking direction of the host vehicle is forward parking, the parking control is executed so that the position of the front wheel of the host vehicle is matched with the parking target p3. In this case, the rear of the vehicle V1 is positioned at the near side in the direction into which the host vehicle enters. In this case, the rear of the vehicle V1 is positioned at the near side in the direction into which the host vehicle enters.

Thereby, when the lengths of the first and second frame lines W1 and W2 are shorter than the wheel base of the vehicle V1, since the control is executed so that the position of the front wheel of the host vehicle is matched with the parking target p3, the projecting from the first frame line W1 and the second frame line W2 of the vehicle V1 can be distinguished between the front side and the rear side, it is possible to suppress the largely projection of any one of the front side or the rear side.

Moreover, when the lengths of the first and second frame lines W1 and W2 are shorter than the wheel base of the vehicle V1, the parking direction of the host vehicle with respect to the free parking space is determined, and if the parking direction of the host vehicle is forward parking, the parking control can be executed so that the position of the front wheel of the host vehicle is matched with the parking target p3. Thus, in forward parking, the vehicle V1 can be parked at a well-balanced position with respect to the first and second frame lines W1 and W2.

(Wheel Base<Length of Frame Line<Vehicle Length)

FIG. 15 is a planar view diagram showing a parking space and a vehicle V1 when the lengths of the first and second frame lines W1 and W2 are longer than the wheel base of the vehicle V1 (host vehicle) and are shorter than the total length of the vehicle V1 (NO of Step S95). In this case, the parking target p3 is set on the straight line L which connects between the end of the far side of the first frame line W1 in a direction into which the host vehicle enters and the end of the far side of the second frame line in the direction into which the host vehicle enters (Step S99).

Figure 15A:
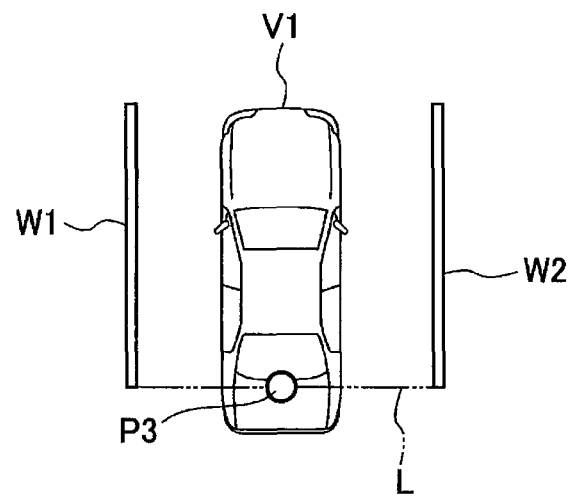
FIG. 15A is a planar view of a parking space and a vehicle when the lengths of first and second frame lines are longer than the wheel base of the vehicle (host vehicle) and shorter than the total length of the vehicle, and is a diagram showing a case of backward parking.

FIG. 15A shows the case of backward parking. In this case, the parking target p3 is set on the straight line L connecting between the ends of the far side in the direction into which the host vehicle enters, and the parking control is executed so that the position of the wheel in travelling direction of the host vehicle is matched with the parking target p3 (first half of Step S100). In this case, the parking control is executed so that the position of the rear wheel of far side in the direction into which the host vehicle enters is matched with the parking target p3 (Step S100).

Figure 15B:
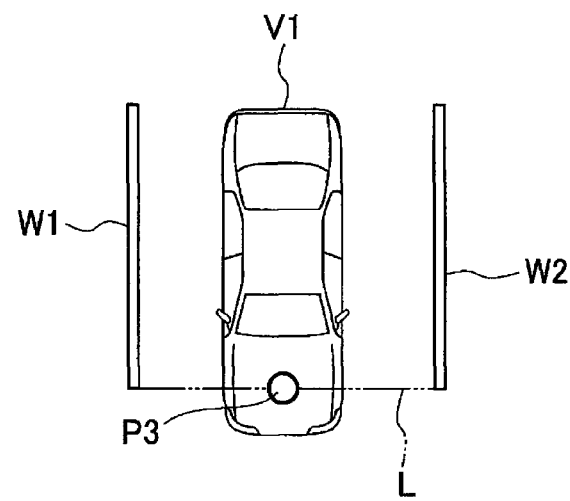
FIG. 15B is a planar view of a parking space and a vehicle when the lengths of first and second frame lines are longer than the wheel base of the vehicle (host vehicle) and shorter than the total length of the vehicle, and is a diagram showing a case of forward parking.

FIG. 15B shows the case of forward parking. Also in this case, the parking target p3 is set on the straight line L connecting between the ends of the far side in the direction into which the host vehicle enters. Then, the parking control is executed so that the position of the front wheel of far side in the direction into which the host vehicle enters is matched with the parking target p3 (Step S100).

Thereby, the vehicle V1 is parked so that the end of the tire is matched with the ends of the first frame line W1 and the second frame line W2 of the far side in the direction into which the host vehicle enters. Accordingly, even when the far side of the frame line has step height or a trench, the vehicle V1 can be parked at the nearer side therefrom.

Moreover, the amount (length) of being projected from the parking space of the vehicle V1 can be appropriately set. Accordingly, the vehicle V1 can be parked at an appropriate position of the parking space.

(Length of Frame Line<Vehicle Length)

It is determined whether the lengths of the first and second frame lines W1 and W2 are shorter than the total length of the vehicle V1 (host vehicle).

When the lengths of the first and second frame lines W1 and W2 are shorter than the total length of the vehicle V1, the parking target p3 is set on the straight line L connecting between the end of the first frame line W1 and the end of the second frame line (Step S97).

When the lengths of the first and second frame lines W1 and W2 are shorter than the total length of the vehicle V1, the parking control is executed so that the position of the wheel of the host vehicle is matched with the parking target p3 set on the straight line L connecting between the end of the first frame line W1 and the end of the second frame line.

Consequently, it can suppress that the host vehicle is largely projected from any of the front side and the rear side due to the projecting from the front or rear side.

Moreover, when the lengths of the first and second frame lines W1 and W2 are shorter than the total length of the vehicle V1, the parking direction of the host vehicle with respect to the free parking space is determined, and if the parking direction of the host vehicle is backward parking, the parking control is executed so that the position of the rear wheel of the host vehicle is matched with the parking target p3. In this case, the front of the vehicle V1 is positioned at the near side in the direction into which the host vehicle enters.

Thereby, when the lengths of the first and second frame lines W1 and W2 are shorter than the total length of the vehicle V1, since the control is executed so that the position of the rear wheel of the host vehicle is matched with the parking target p3, the projecting from the first frame line W1 and the second frame line W2 of the vehicle V1 can be distinguished between the front side and the rear side, it is possible to suppress the largely projection of any one of the front side or the rear side.

In addition, when the lengths of the first and second frame lines W1 and W2 are shorter than the total length of the vehicle V1, the parking direction of the host vehicle with respect to the free parking space is determined, and if the parking direction of the host vehicle is backward parking, the parking control can be executed so that the position of the rear wheel of the host vehicle is matched with the parking target p3. Thus, in backward parking, the vehicle V1 can be parked at a well-balanced position with respect to the first and second frame lines W1 and W2.

Moreover, when the lengths of the first and second frame lines W1 and W2 are shorter than the total length of the vehicle V1, The parking direction of the host vehicle with respect to the free parking space is determined, and if the parking direction of the host vehicle is forward parking, the parking control is executed so that the position of the front wheel of the host vehicle is matched with the parking target p3. In this case, the rear of the vehicle V1 is positioned at the near side in the direction into which the host vehicle enters.

Thereby, when the lengths of the first and second frame lines W1 and W2 are shorter than the total length of the vehicle V1, since the control is executed so that the position of the front wheel of the host vehicle is matched with the parking target p3, the projecting from the first frame line W1 and the second frame line W2 of the vehicle V1 can be distinguished between the front side and the rear side, it is possible to suppress the largely projection of any one of the front side or the rear side.

Moreover, when the lengths of the first and second frame lines W1 and W2 are shorter than the total length of the vehicle V1, the parking direction of the host vehicle with respect to the free parking space is determined, and if the parking direction of the host vehicle is forward parking, the parking control can be executed so that the position of the front wheel of the host vehicle is matched with the parking target p3. Thus, in forward parking, the vehicle V1 can be parked at a well-balanced position with respect to the first and second frame lines W1 and W2.

(Only End of Frame Line)

The frame line for specifying the parking space becomes thinner with passage of time, and finally disappears. Only the end of the frame line may remain in the process. Next, the parking target p3 in such a case will be explained.

In this case, the frame line is shorter than the wheel base (YES in Step S95), and the length of the frame line corresponds to equal to or less than the predetermined length (NO in Step S96).

FIG. 16 is a planar view diagram showing a parking space and a vehicle V1 in which only the end of the first and second frame lines W1 and W2 of the far side in the direction into which the vehicle V1 enters remains. In this case, the parking target p3 is set on the straight line L connecting between the end of the far side of the first frame line W1 in a direction into which the host vehicle enters and the end of the far side of the second frame line in the direction into which the host vehicle enters (Step S99).

That is, when the end of the first frame line W1 of the far side in the direction into which the host vehicle enters, and the end of the second frame line W2 (forming a pair with the first frame line W1) of the far side in the direction into which the host vehicle enters can be detected, the parking target p3 is set on the straight line connecting between the end on the first frame line W1 and the end on the second frame line W2, and the parking control is executed so that the position of the wheel of the far side in direction which the host vehicle enters to the free parking space is matched with the parking target p3 (first half of Step S100). Consequently, it can suppress that the host vehicle is largely projected from any of the front side and the rear side due to the projecting from the rear side.

Figure 16A:
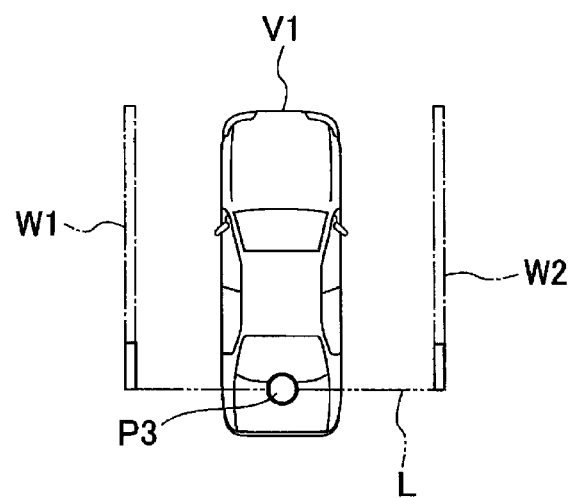
FIG. 16A is a planar view of a parking space and a vehicle when only an end on a far side in a vehicle entering direction of first and second frame lines remains, and is a diagram showing a case of backward parking.
Figure 16B:
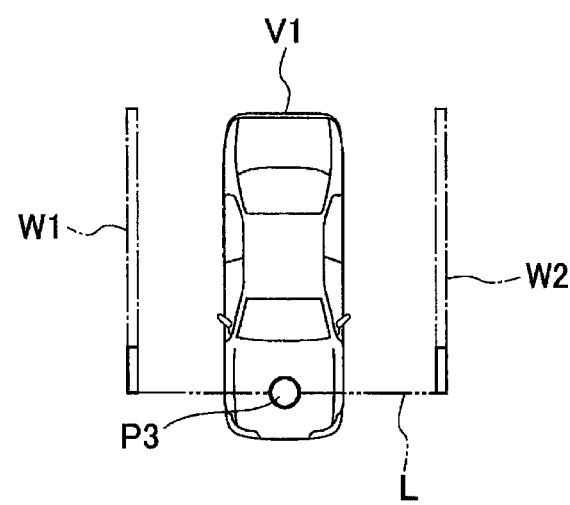
FIG. 16B is a planar view of a parking space and a vehicle when only an end on a far side in a vehicle entering direction of first and second frame lines remains, and is a diagram showing a case of forward parking.

FIG. 16A shows a case of forward parking, and FIG. 16B shows a case of backward parking. FIGS. 16A and 16B respectively corresponds to FIGS. 15A and 15B. Detailed explanation of FIG. 16 is omitted.

Figure 17A:
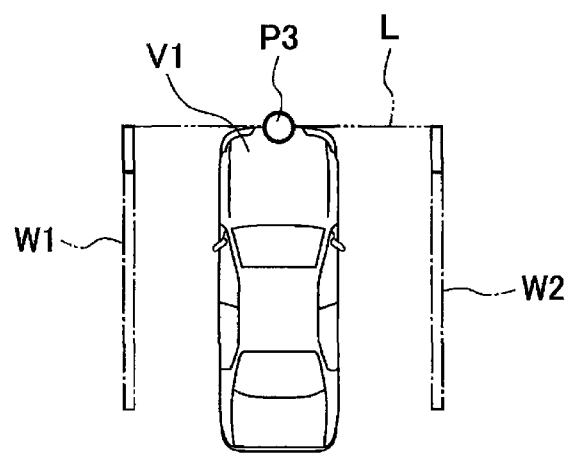
FIG. 17A is a planar view of a parking space and a vehicle when only an end on a near side in a vehicle entering direction of first and second frame lines remains, and is a diagram showing a case of backward parking.
Figure 17B:
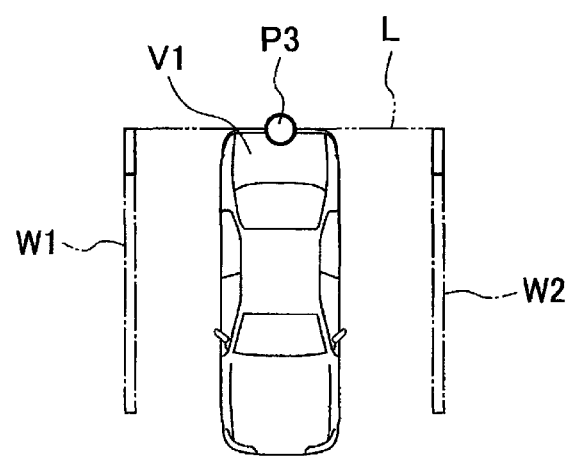
FIG. 17B is a planar view of a parking space and a vehicle when only an end on a near side in a vehicle entering direction of first and second frame lines remains, and is a diagram showing a case of forward parking.

FIG. 17 is a planar view diagram showing a parking space and a vehicle V1 in which only the end of the first and second frame lines W1 and W2 of the near side in the direction into which the vehicle V1 enters remains. In this case, the parking target p3 is set on the straight line L connecting between the end of the far side of the first frame line W1 in a direction into which the host vehicle enters and the end of the far side of the second frame line in the direction into which the host vehicle enters (Step S99).

In this case, when the end of the first frame line W1 of the near side in the direction into which the host vehicle enters, and the end of the second frame line W2 (forming a pair with the first frame line W1) of the near side in the direction into which the host vehicle enters can be detected, the parking target p3 is set on the straight line connecting between the end on the first frame line W1 and the end on the second frame line W2, and the parking control is executed so that the position of the end of the near side in direction which the host vehicle enters to the free parking space is matched with the parking target p3 (second half of Step S100). Consequently, it can suppress that the host vehicle is largely projected from any of the front side and the rear side due to the projecting from the front side.

(Length of First Frame Line W1 is Different from Second Frame Line W2)

The first frame line W1 and the second frame line W2 for specifying the parking space are not always represented in the same shape. For example, when a case where a traveling lane R1 is slanting, or the parking space is oddly shaped, the lengths of the first frame line W1 and the second frame line W2 may be different from each other. Moreover, when the end of one frame line disappears more than another end with passage of time, the lengths of the first frame line W1 and the second frame line W2 may be different from each other. Moreover, a part of the frame line may be undetectable by the sensor.

Figure 18A:
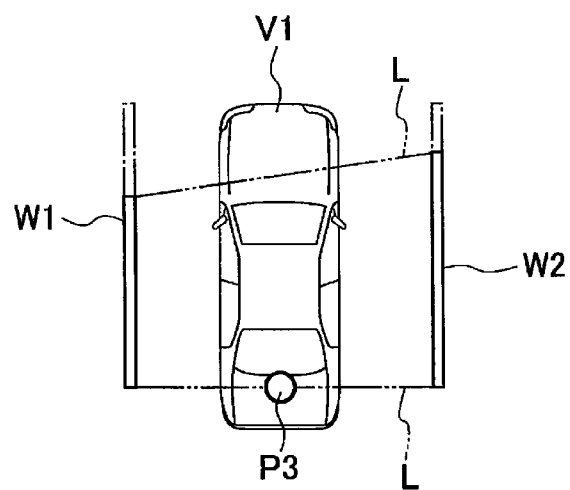
FIG. 18A is a planar view of a parking space and a vehicle when the lengths of first and second frame lines are different from each other, and is a diagram showing a case of backward parking.
Figure 18B:
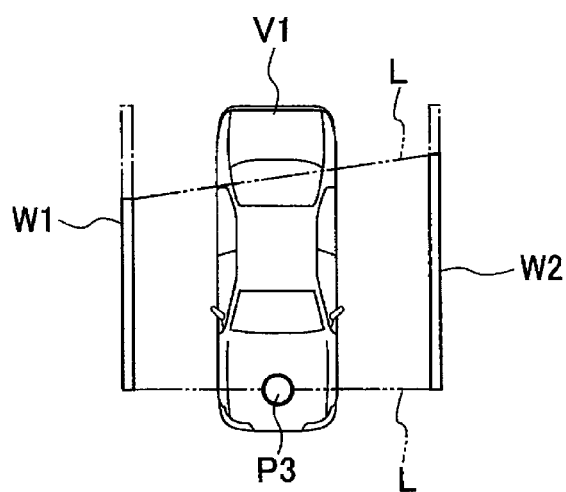
FIG. 18B is a planar view of a parking space and a vehicle when the lengths of first and second frame lines are different from each other, and is a diagram showing a case of forward parking.

FIG. 18 is a planar view diagram showing a parking space and a vehicle V1 when the lengths of the first frame line W1 and the second frame line W2 are different from each other. This example shows a case where the end of the first frame line W1 of the near side in the direction into which the vehicle V1 enters disappears more than the end of the second frame line W2 forming a pair with the end of the first frame line W1, and the length of the first frame line W1 became shorter than that of the second frame line W2.

In the example shown in FIG. 18, the angle between the straight line L connecting between the end of the first frame line W1 and the end of the second frame line W2 forming a pair with the first frame line W1, and the first frame line W1 or the second frame line W2 is not a right angle (NO in Step S91). Moreover, the angle between the straight line L connecting between the end of the first frame line W1 of far side in the direction into which the vehicle V1 enters and the end of the second frame line W2, and the first frame line W1 or the second frame line W2 is a right angle or is near the right angle.

In this case, the parking target p3 is set on the straight line L of the far side in the direction into which the vehicle V1 enters. That is, the parking target p3 is set on the straight line L in which the angle between the straight line L connecting between the end of the first frame line W1 and the end of the second frame line W2 forming a pair therewith, and the first frame line W1 or the second frame line W2 is near the right angle (Step S101).

Then, the parking control is executed so that the wheel of the far side in the direction into which the host vehicle enters to the free parking space is matched with the parking target p3 (first half of Step S102). In the case of backward parking, the vehicle V1 is parked so that the end of the rear wheel (rear side) of the vehicle V1 is matched with the parking target p3. In the case of forward parking, the vehicle V1 is parked so that the end of the front wheel (front side) of the vehicle V1 is matched with the parking target p3.

Thereby since the parking target p3 is sets on the straight line near the right angle for the vehicle V1, many vehicles V1 can be parked inside the free parking space. Thus, the amount of projecting of the front side or the rear side can be suppressed.

Moreover, the vehicle is parked so that the wheel of the far side in the direction into which the host vehicle enters to the free parking space is matched with the ends of the first frame line W1 and the second frame line W2 of the far side in the direction into which the host vehicle enters. This effect thereof is the same as the case of "Wheel Base<Length of Frame Line<Vehicle Length (FIG. 15)."

Moreover, the angle between the straight line L connecting between the end of the first frame line W1 of near side in the direction into which the vehicle V1 enters and the end of the second frame line W2, and the first frame line W1 or the second frame line W2 is a right angle or is near the right angle (not shown), the parking target p3 is set on the straight line L of the near side in the direction into which the vehicle V1 enters (Step S101).

Then, the parking control is executed so that the end of the near side in the direction into which the host vehicle enters to the free parking space is matched with the parking target p3 (second half of Step S102). In the case of backward parking, the vehicle V1 is parked so that the end of the rear side of the vehicle V1 is matched with the parking target p3. In the case of forward parking, the vehicle V1 is parked so that the end of the front side of the vehicle V1 is matched with the parking target p3. Thereby, the vehicle V1 is parked so that the end of the vehicle is matched with the ends of the first frame line W1 and the second frame line W2 of the near side in the direction into which the host vehicle enters.

Thereby, the vehicle V1 is parked so that the end of the near side in the direction into which the host vehicle enters to the free parking space is matched with the ends of the first frame line W1 and the second frame line W2 of the near side in the direction into which the host vehicle enters. The effect thereof is the same as the case of "Length of Frame Line>Vehicle Length (FIG. 13)."

Moreover, a difference between the length of the first frame line W1 and the length of the second frame line W2 is detected, and if the difference between the lengths is equal to or greater than the predetermined value (e.g., 50 cm), the parking target p3 is set on the straight line L in which the angle between the straight line L connecting between the end of the first frame line W1 and the end of the second frame line W2 forming a pair therewith, and the first frame line W1 or the second frame line W2 is near the right angle.

If the difference between the length of the first frame line W1 and the length of the second frame line W2 is equal to or greater than the predetermined value, the vehicle V1 may be largely projected from any of the front side or the rear side. However, the difference between the length of the first frame line W1 and the length of the second frame line W2 is detected, and if the difference between the lengths is equal to or greater than the predetermined value (e.g., 50 cm), the parking target p3 is set on the straight line L in which the angle between the straight line L connecting between the end of the first frame line W1 and the end of the second frame line W2 forming a pair therewith, and the first frame line W1 or the second frame line W2 is near the right angle. Accordingly, the projecting of the front side or the rear side can be suppressed.

As mentioned above, according to the parking assistance method according to the present embodiment, the first frame line W1 of the free parking space in the direction orthogonal to the vehicle width direction and the second frame line W2 which forms a pair with the first frame line are detected, the parking target p3 is set on the straight line L connecting between the point on the first frame line W1 and the point on the second frame line W2, and parking control is executed so that the position of the wheel of the host vehicle is matched with the parking target p3. Thereby, the vehicle can be parked at an appropriate position of the free parking space.

Moreover, the parking target is set on the straight line connecting between the end on the first frame line and the end on the second frame line, and the parking control is executed so that the position of the wheel of the host vehicle is matched with the parking target. Thereby, since the projecting of the vehicle V is distinguishable between the front side and the rear side, the projecting of the front side or the rear side can be suppressed.

Moreover, the free running distance L1 when the vehicle V1 stops at the turnabout position p2 is measured, this free running distance L1 is used as an amount of deviation, and the target speed is corrected so that the amount of deviation may be reduced. Accordingly, even when the free running distance is generated, the vehicle V1 can be parked at the parking target p3 with high accuracy.

Moreover, the vehicle V1 is moved backward by the same distance as the free running distance L1 when the vehicle V1 stops at the turnabout position p2, and the vehicle V1 is subsequently moved backward along the parking route x1. Accordingly, even if the vehicle V1 performs free running at the turnabout position p2, the amount of deviation is compensated and therefore it is possible to move the vehicle along the parking route x1.

Moreover, when the vehicle V1 is moved backward by the same distance as the free running distance L1, the free running distance L1 is set as the same steering angle as the case of moving forward, and therefore it is possible to securely compensate the free running distance L1.

The amount of deviation to be generated between the current position of the vehicle V1 due to the following delay of the actual steering angle with respect to the target steering angle, and the position in the target route is estimated, and the target steering angle is corrected so that the amount of deviation is reduced. Accordingly, even if such a following delay of the steering angle is generated, the vehicle can be securely moved along the parking routes x0 and x1.

Moreover, the amount of deviation to be generated between the current position of the vehicle V1 due to the steady-state deviation of the actual steering angle with respect to the target steering angle, and the position in the target route is estimated, and the target steering angle is corrected so that the amount of deviation is reduced. Accordingly, even if such steady-state deviation of the steering angle is generated, the vehicle can be securely moved along the parking routes x0 and x1. Accordingly, the vehicle V1 can be parked at an appropriate position of the parking space.

When a wheel stopper is detected in a free parking space and the wheel stopper is actually detected, the parking control can be executed so that the position of the wheel of the host vehicle may be matched with the wheel stopper. Accordingly since the vehicle V1 can be parked so as to be matched with the wheel stopper also if there is the wheel stopper, the vehicle V1 can be parked at the appropriate position in the free parking space.

The parking control device 100 according to the present embodiment can be used for an intelligent parking assist for automatically controlling driving so that the vehicle is reached to the parking target p3 along the parking route set by the parking route generation unit 31.

Moreover, if adopting, into the above-mentioned configuration, the configuration to which added the support information display function for displaying various support information which is utilized when the drivers execute the driving operation at the time of parking, such as graphics for specifying the current position of the vehicle V1, graphics for representing the parking target p3 and the turnabout position p2, information for instructing the steering angle at the initial position p1 or the turnabout position p2, for example, the drivers can be assisted so as to be easier to operate. Furthermore, if the audio assist for guiding a steering direction, a steering amount, etc. can be executed using a loudspeaker mounted in the vehicle V1 so that the vehicle V1 can be moved along the parking routes x0 and x1, more detailed parking assistance can be realized.

As mentioned above, although the parking assistance method and the parking control device of the present invention has been explained on the basis of the illustrated embodiments, the present invention is not limited thereto, and the configuration of each part can be replaced by any configurations having a similar function. For example, in the above-described embodiments, the examples in which vehicles are parked in parallel have been described, but the present invention can also be applied to parallel parking. Further, the present invention is not limited to vehicles but can be applied to any mobile body.

The functions described in the respective embodiments may be implemented in one or more processing circuits. Such a processing circuit includes a programmed processing device such as a processing device including an electric circuit. Moreover, the processing device may include an Application Specific Integrated Circuit (ASIC) and/or a device such as a conventional circuit component, configured to execute the functions described in the respective embodiments.

The parking assistance method of the present invention is executed when there is no obstacle around the host vehicle. For example, when the target parking frame detection sensor 10 detects any obstacle on the parking route, needless to say, the parking assistance control is immediately stopped and safety is a top priority.

REFERENCE SIGNS LIST

10 Target parking frame detection sensor
10a, 10b, 10c, 10d Camera
10e Frame line detection circuit
20 Image information processing unit (target position setting circuit)
21 Target parking frame detection unit
22 Target parking position setting unit
23 Parking starting position setting unit
24 Current position estimation unit
30 Parking assistance calculation unit (vehicle control circuit)
31 Parking route generation unit
32 Parking route tracking control unit
33 Steering angle control unit
34 Target speed generation unit
35 Speed control unit
40 Vehicle control ECU
50 Actuator
51 Input interface
52 Wheel speed sensor
53 Steering angle sensor

The invention claimed is:

1. A parking assistance method of a parking control device that executes parking control with respect to an available parking space near a host vehicle, the parking assistance method comprising:
   detecting a first frame line of the available parking space in a direction orthogonal to a vehicle width direction and a second frame line that forms a pair with the first frame line, wherein the first frame line and the second frame line are physically present in or adjacent to the available parking space;
   comparing a length of the first frame line against a length of the host vehicle;
   when the length of the first frame line is longer than the length of the host vehicle, setting the parking target on a straight line connecting between an end of a near side of the first frame line in a direction into which the host vehicle enters and an end of a near side of the second frame line in a direction into which the host vehicle enters;
   when the length of the first frame line is shorter than the length of the host vehicle, setting the parking target on a straight line connecting between an end of a far side of the first frame line in a direction into which the host vehicle enters and an end of a far side of the second frame line in a direction into which the host vehicle enters; and
   executing the parking control so that a position of the host vehicle is matched with the parking target.

2. The parking assistance method according to claim 1, further comprising:
   setting the parking target on a straight line in which an angle between the straight line connecting between an end of the first frame line and an end of the second frame line forming a pair therewith, and the first frame line or the second frame line is near a right angle.

3. The parking assistance method according to claim 1, further comprising:
   detecting a difference between the length of the first frame line and a length of the second frame line; and
   when the difference between the lengths is equal to or greater than a predetermined value, setting the parking target on a straight line in which an angle between the straight line connecting between an end of the first frame line and an end of the second frame line forming a pair therewith, and the first frame line or the second frame line is near a right angle.

4. The parking assistance method according to claim 1, further comprising:
   detecting the length of the first frame line; and
   executing the parking control so that the position of a wheel of the host vehicle is matched with the parking target.

5. The parking assistance method according to claim 4, further comprising:
   determining a parking direction of the host vehicle with respect to the available parking space;
   when the host vehicle is backward parking and a length of the first frame line is shorter than the length of the host vehicle, executing the parking control so that a position of a rear wheel of the host vehicle is matched with the parking target; and
   when the host vehicle is backward parking and the length of the first frame line is longer than the length of the host vehicle, executing the parking control so that a position of a front edge of the host vehicle is matched with the parking target.

6. The parking assistance method according to claim 4, further comprising:
   determining a parking direction of the host vehicle with respect to the available parking space;
   when the host vehicle is forward parking and a length of the first frame line is shorter than the length of the host vehicle, executing the parking control so that a position of a front wheel of the host vehicle is matched with the parking target; and
   when the host vehicle is forward parking and the length of the first frame line is longer than the length of the host vehicle, executing the parking control so that a position of a rear edge of the host vehicle is matched with the parking target.

7. A parking control device that executes parking control with respect to an available parking space near a host vehicle, the parking control device comprising:
   a target parking frame detection sensor configured to detect a first frame line of the available parking space in a direction orthogonal to a vehicle width direction and a second frame line which forms a pair with the first frame line, wherein the first frame line and the second frame line are physically present in or adjacent to the available parking space;
   a target position setting circuit configured to compare a length of the first frame line to a length of the host vehicle, set the parking target on a straight line connecting between an end of a near side of the first frame line in a direction into which the host vehicle enters and an end of a near side of the second frame line in a direction into which the host vehicle enters when the length of the first frame line is longer than the length of the host vehicle, or set the parking target on a straight line connecting between an end of a far side of the first frame line in a direction into which the host vehicle enters and an end of a far side of the second frame line in a direction into which the host vehicle enters when the length of the first frame line is shorter than the length of the host vehicle; and
   a vehicle control circuit configured to execute the parking control so that a position of a wheel of the host vehicle is matched with the parking target.

* * * * *